(12) United States Patent
Wilson et al.

(10) Patent No.: US 8,498,344 B2
(45) Date of Patent: Jul. 30, 2013

(54) FREQUENCY RESPONSIVE BUS CODING

(75) Inventors: John M. Wilson, Raleigh, NC (US);
Aliazam Abbasfar, Menlo Park, CA (US); John Eble, III, Chapel Hill, NC (US); Lei Luo, Durham, NC (US); Jade M. Kizer, Durham, NC (US); Carl William Werner, Los Gatos, CA (US); Wayne Dettloff, Cary, NC (US)

(73) Assignee: Rambus Inc., Sunnyvale, CA (US)

( * ) Notice: Subject to any disclaimer, the term of this patent is extended or adjusted under 35 U.S.C. 154(b) by 337 days.

(21) Appl. No.: 12/999,495

(22) PCT Filed: Jun. 18, 2009

(86) PCT No.: PCT/US2009/003697
§ 371 (c)(1),
(2), (4) Date: Dec. 16, 2010

(87) PCT Pub. No.: WO2009/154797
PCT Pub. Date: Dec. 23, 2009

(65) Prior Publication Data
US 2011/0127990 A1    Jun. 2, 2011

Related U.S. Application Data

(60) Provisional application No. 61/132,585, filed on Jun. 20, 2008.

(51) Int. Cl.
*H04B 3/00* (2006.01)
*H04L 25/00* (2006.01)
(52) U.S. Cl.
USPC .............................. 375/257; 341/51

(58) Field of Classification Search
USPC .......... 375/288, 257, 260, 377, 242; 710/100, 710/107, 305; 326/62, 82, 90; 370/359, 365; 327/100, 108; 341/50–51
See application file for complete search history.

(56) References Cited

U.S. PATENT DOCUMENTS

| 4,215,245 | A |   | 7/1980  | Bellisio ............................ 370/84 |
| 4,620,311 | A |   | 10/1986 | Schouhamer Immink ..... 375/19 |
| 5,025,256 | A |   | 6/1991  | Stevens ............................ 341/59 |
| 5,278,902 | A |   | 1/1994  | Nugent ............................ 380/42 |
| 5,621,755 | A | * | 4/1997  | Bella et al. ..................... 375/219 |

(Continued)

OTHER PUBLICATIONS

Stan, Mircea R, "Bus-Invert Coding for low power I/O," IEEE Transactions on Very Large Scale Integration (VLSI) Systems, vol. XX, No. Y, 1999, pp. 100-108.

(Continued)

*Primary Examiner* — Jean B Corrielus
(74) *Attorney, Agent, or Firm* — The Neudeck Law Firm, LLC

(57) ABSTRACT

A data system 102 permits bus encoding based on frequency of the bus; an encoding scheme may be implemented to avoid undesirable frequency conditions such as a resonant condition that may lead to degradation in system performance. The device or integrated circuit will typically include an encoder; in one embodiment, the encoder is a data bus inversion (DBI) circuit that selectively inverts all lines of a data bus. A detector that may include a band-pass or stop-band filter that, for example, evaluates data for transmission on the bus to detect frequency, for example, a predetermined frequency or a frequency range. The detector provides a control signal for the encoder to selectively apply an encoding scheme as a function of frequency.

42 Claims, 17 Drawing Sheets

U.S. PATENT DOCUMENTS

| | | | | |
|---|---|---|---|---|
| 5,691,527 | A * | 11/1997 | Hara et al. | 235/456 |
| 6,160,423 | A | 12/2000 | Haq | 327/41 |
| 6,188,978 | B1 * | 2/2001 | Harada | 704/201 |
| 6,577,684 | B1 | 6/2003 | Hirano et al. | 375/286 |
| 6,661,355 | B2 | 12/2003 | Cornelius et al. | 341/58 |
| 6,700,510 | B1 | 3/2004 | Kryzak et al. | 341/59 |
| 6,844,833 | B2 | 1/2005 | Cornelius et al. | 341/58 |
| 6,927,709 | B2 | 8/2005 | Kiehl | 341/102 |
| 7,307,554 | B2 | 12/2007 | Kojima | 341/58 |
| 7,400,276 | B1 * | 7/2008 | Sotiriadis et al. | 341/61 |
| 7,447,929 | B2 | 11/2008 | McCall et al. | 713/323 |
| 7,522,073 | B1 | 4/2009 | Kao | 341/55 |
| 7,616,133 | B2 | 11/2009 | Hollis | 341/58 |
| 7,640,444 | B2 * | 12/2009 | Graef | 713/320 |
| 2004/0124715 | A1 | 7/2004 | Huang et al. | 307/127 |
| 2005/0283349 | A1 * | 12/2005 | Takemura et al. | 703/14 |
| 2006/0220928 | A1 * | 10/2006 | Ito et al. | 341/50 |
| 2007/0074055 | A1 | 3/2007 | McCall et al. | 713/300 |
| 2007/0115733 | A1 | 5/2007 | Jang et al. | 365/189.07 |
| 2007/0174643 | A1 * | 7/2007 | Graef | 713/300 |
| 2007/0229324 | A1 * | 10/2007 | Visalli et al. | 341/51 |
| 2008/0270125 | A1 * | 10/2008 | Choo et al. | 704/205 |
| 2008/0281604 | A1 * | 11/2008 | Choo et al. | 704/500 |
| 2009/0237279 | A1 * | 9/2009 | Duan | 341/81 |

OTHER PUBLICATIONS

Stan, Mircea and Burleson, W.P., "Coding a Terminated Bus for Low Power", Great Lakes Symposium on VLSI, pp. 70-73, Mar. 1995.

Nakamura et al., "A 50% Noise Reduction Interface Using Low-Weight Coding", 1996 Symposium on VLSI circuits Digest of Technical Papers, pp. 144-145.

Stan et al., "Bus-Invert Coding for low-Power I/O" IEEE Transactions on very large Scale Integration (VLSI) systems, vol. 3, No. 1, Mar. 1995. pp. 49-58. 10 pages.

Liu, Hui, et al., "Pre-Driver PDN SSN, OPD, Data Encoding, and Their Impact on SSJ." Electronic Components and Technology Conference dated May 26, 2009. pp. 1127-1131.

Drabkin, Victor et al. "Aperiodic Resonant Excitation of Microprocessor Power Distribution Systems and the Reverse Pulse Technique," Proceedings of Electrical Performance of Electronic Packaging conference, 2002, pp. 175-178 downloaded on Aug. 9, 2009. 4 pages.

Schmitt, R. et al., "Power Integrity Analysis of DDR2 Memory Systems During Simultaneous Switching Events," DesignCon 2006, Santa Clara, California, Feb. 6-9, 2006.

International Search Report and the Written Opinion with mail date of Jun. 14, 2010 re International Application No. PCT/US2009/003697. 17 Pages.

International Search Report and Written Opinion with mail date of Jul. 20, 2010 for International Application No. PCT/US2009/066253. 9 pages.

Article 34 Amendment, Reply to Written Opinion, dated Sep. 9, 2010 in International Application No. PCT/US2009/003697. 2 pages.

International Preliminary Report (Chapter II) with mailing date of Feb. 4, 2011 re Int'l. Application No. PCT/US09/03697. 7 Pages.

EP Official Communication dated Jun. 6, 2011 re EP Application No. 09767110.1. 8 Pages.

EP Response dated Oct. 14, 2011 to the Official Communication dated Jun. 6, 2011 re EP Application No. 09767110.1. 30 Pages.

Oh, Kyung Suk, U.S. Appl. No. 12/971,213, filed Dec. 17, 2010, Office Action mailed Feb. 21, 2012. 10 pages.

International Preliminary Report on Patentability (Chapter II) dated Mar. 22, 2012 re Int'l Application No. PCT/US09/66253. 8 pages.

* cited by examiner

Example of PDN impedance with multiple resonance peaks in the frequency domain (optional)

FREQUENCY RESPONSIVE BUS CODING

CROSS-REFERENCE TO RELATED APPLICATION

The present application claims the benefit of, and is a 371 of, international application number PCT/US2009/003697, entitled FREQUENCY RESPONSIVE BUS CODING, filed Jun. 18, 2009, which claims the benefit of U.S. Provisional Application Ser. No. 61/132,585, filed Jun. 20, 2008, entitled FREQUENCY RESPONSIVE BUS CODING, the disclosure of which is hereby incorporated herein by reference.

BACKGROUND ART

Computing, communications, consumer electronics and other processor-based or digital systems are driven to host a larger number of applications, each with increasing complexity. The transfer of information and signals required among the components of such systems leads to increasing demands on the devices involved in the transfer of data. Indeed, the configuration and characteristics of the power delivery network ("PDN") involved in driving and/or receiving bus transmissions can have consequences on overall performance of the data system. For example, the impedance of a power delivery network is often characterized by frequency response issues, such as a strong resonance. In some systems, a strong resonance can occur in a frequency range from about 100-300 MHz, depending on the system characteristics. These frequency response issues can degrade the quality of supply voltage of the system, affect voltage and timing margins, and otherwise engender data dependent delay, gain reduction in amplifiers, and/or bit errors in samplers. Other bus frequency-related issues can also cause problems; for example, it is well known that even wired electronic devices can exhibit radio frequency characteristics which are undesirable because they interfere with, or be interfered with from, other devices.

It is desirable to minimize such degradation issues while maintaining the general principles of operation of the system.

BRIEF DESCRIPTION OF THE DRAWINGS

The present technology is illustrated by way of example, and not by way of limitation, in the figures of the accompanying drawings, in which like reference numerals refer to similar elements including.

DETAILED DESCRIPTION

Figure 1:
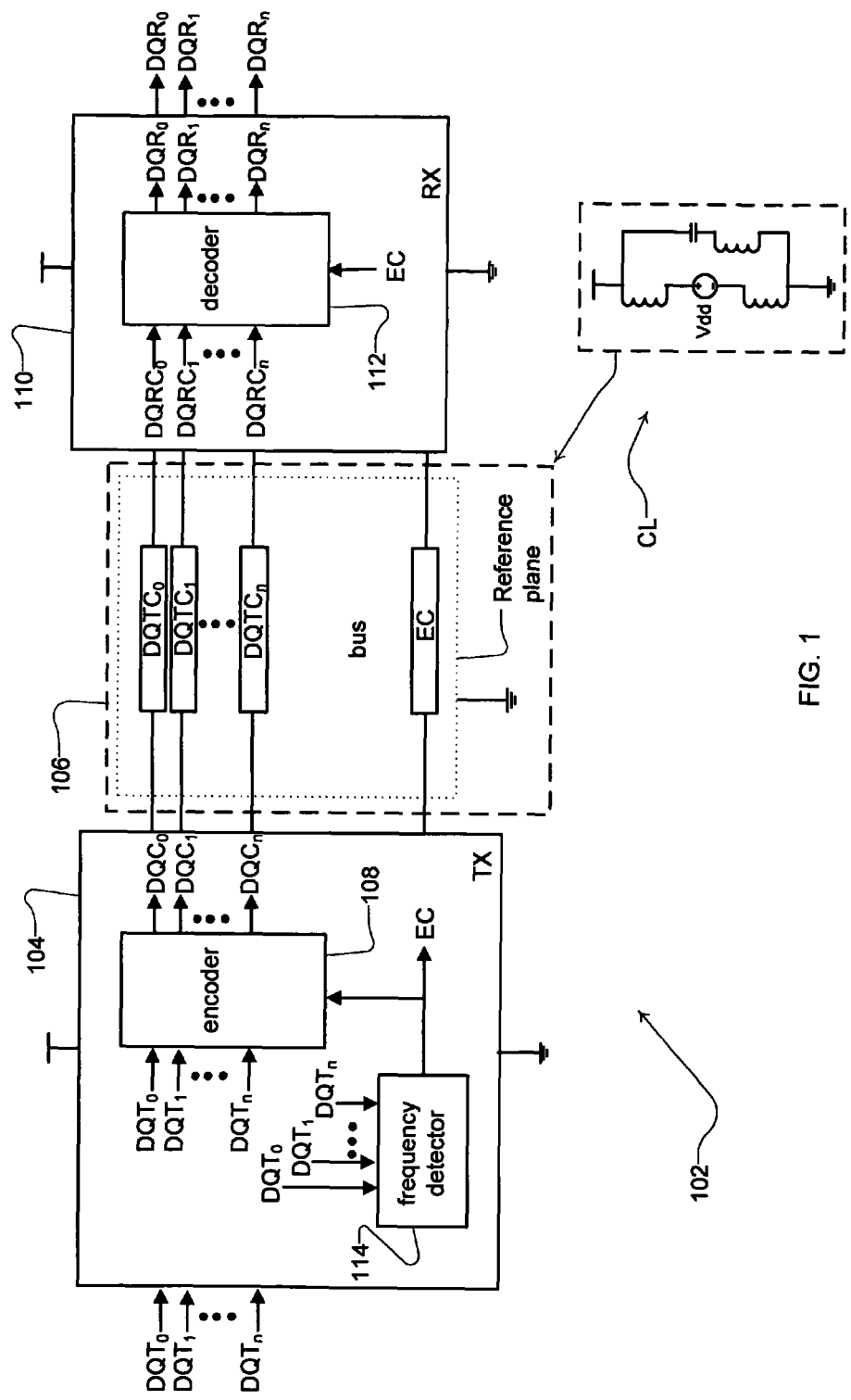
FIG. 1 is a block diagram illustrating example elements of an embodiment of a data system that is suitable for implementing the present frequency-based bus coding technology.

A data system 102, such as the frequency-based bus coding system according to one embodiment of the present technology, is illustrated in FIG. 1. The components of the system control data transmissions on the bus by monitoring frequency content of the bus to detect one or more frequencies, such as a frequency that can lead to or be suggestive of the potential for system performance degradation. The detected frequencies can be signals that are actively transmitted by one or more components and, if desired, may include signals passively transmitted (e.g., accounting for bus idle time, return or other communications transmitted on the bus). Upon detection of a particular frequency, frequencies or range(s) of frequencies, the data system components alter the control of the encoding scheme used for transmitting data onto the bus to achieve specific frequency-related goals. For example, in one implementation, the frequency-based bus coding system may detect a resonant frequency condition associated with the data of the bus; in a second implementation, the frequency-based bus encoding system may avoid specific frequencies, e.g., to avoid interference with or from other nearby electronic devices, or to achieve other frequency-related goals. In response, the frequency-based bus coding system may selectively encode some or all lines of at least one data bus such as by controlling encoding (e.g., activation of data bus inversion) for the bus communications. In yet another implementation, frequency-related goals may be made to be dynamic, e.g., selectively turned "on" or "off," or actively changed depending upon environment (e.g., to implement an "airplane mode"), with mode selection being made automatic if desired.

FIG. 1 illustrates an embodiment that may be used to address resonance-related issues. For example, in a system configured for single-ended signaling, the aggregate induced current associated with the transient data of numerous channels can excite the resonance of the system and reduce the performance of the entire system. This simultaneous switching noise that may result from numerous output drivers of one or more busses switching can produce wide-band energy that can degrade the quality of the supply voltage of the system. When this induced noise is coupled to the voltage reference (and any input nodes) it directly degrades the voltage and timing margin of the system. In addition, if the noise is large enough it may cause any circuits operating from the infected PDN to be pushed outside of their normal operating region. It may even cause, for example, data dependent delay, gain reduction in amplifiers, and/or bit errors in samplers.

To mitigate these issues, as illustrated in the embodiment of FIG. 1, typical components of a frequency-based bus coding system may include a transmitter 104, a bus 106, a receiver 110, an encoder 108, a decoder 112 and at least one frequency detector 114. FIG. 1 also illustrates a simplified equivalent circuit model CL. The model CL represents an example power delivery network associated with the bus 106. The illustrated model includes inductance of the power and the ground return path. It also includes decoupling capacitance with a finite series inductance. For simplicity purposes, resistances have been omitted.

As depicted in FIG. 1, the data system 102 will include a detector 114, such as a frequency detector. The detector 114 may be implemented to detect or predict energy related characteristics associated with the channels or signal lines of the bus 106. The detector produces an encoding control signal (EC) that will control the setting of the state of the coding scheme of the encoder 108 and/or decoder 112. The frequency detector may be implemented to make a spectrum-based or frequency-based decision for controlling encoding of data to be transmitted on the bus. Depending on the set frequency response(s) of the detector, this may be implemented to reduce or avoid an energy characteristic of the bus under certain transmission conditions of the bus such as for spectrum smoothing or shaping around a particular frequency. For example, the detector may be implemented to control encoding as a function of an aggregate current of some or all of the lines of the bus 106 to change the current so that its spectral content is low in energy at or around a chosen frequency, such as a resonant frequency, that may be associated with an undesirable or peak noise condition of the power delivery network of the system. In some embodiments, encoding of the data might also be used to reduce spectral energy in more than one band of frequencies. However, such frequency-based bus encoding may also be implemented to make encoding decisions that do not reduce peak energy or noise characteristics.

Thus, the detector 114 may evaluate two or more unit intervals, such as successive unit intervals, of the data of the data signals to be transmitted (e.g., $DQT_0, DQT_1 \ldots DQT_n$) that are associated with some or all of the data lines of the bus 106. Optionally, the evaluation may also include other or all signal lines of the bus such as the line(s) indicating bus encoding, a masking signal line, control lines of any control or addressing signals, etc. The evaluation may predict a potential undesired frequency situation with the potential aggregate energy or current of the bus and make a change in encoding or otherwise make an encoding decision to avoid or reduce an undesirable or detrimental energy situation on the bus. Such a frequency-based predictive encoding decision may thus be utilized to avoid problems that may be harmful to or otherwise degrade the overall system performance. Such problems may include resonance of the power delivery network induced by switching bus outputs; peak switching noise at the resonance of frequency of the power delivery network; noise injection to other circuits that have specific frequency sensitivities such as phase locked loops (PLLs,) delay locked loops (DLLs,) filters, clock buffers, etc.

For example, by determining a particular resonant frequency based on the impedance of the power delivery network and/or return path of a system incorporating the present technology and by configuring the detector to respond at or about that frequency, an encoding scheme may be controlled to avoid less desired operating conditions for the power delivery network. For example, the detector may be implemented with one or more filters, such as with analog (e.g., continuous-time) and/or digital filters, with a particular frequency response. The detector may then generate the encoding control signal for setting the encoder 108 and/or decoder 112 based on the particular frequency response.

In some embodiments, the filter may be implemented as one or more band-stop and/or one or more band-pass filter(s) depending on the system configuration and desired frequency response. Optionally, high pass and/or low pass filters may also be implemented. Some embodiments may even be based on FIR and/or IIR filters. Moreover, some implementations may use switch-capacitor filters, or a mixed-mode filtering system, which converts an aggregate predicted current into an analog signal and uses current mixing circuits in the frequency-based determination and then converts the information back to a digital encoding control signal. Techniques such as delta-sigma modulation may also be implemented in such a detector for the conversion.

The data system may also typically include at least one transmitter 104. Transmitter 104 typically transmits data onto the lines or signal paths of a bus 106. The transmitter may include a plurality of signal drivers (not shown in FIG. 1). Each signal driver may transmit a data signal on a path or channel (e.g., a line) of the bus 106. Transmission of data will typically be regulated by one or more transmit clock signals to permit the drivers to each transmit data within a common data interval or unit interval of the data signal. Each signal path of the bus may be a single ended signal path or signal line, for example. Although not shown in FIG. 1, it will be understood that the system may employ other elements for data transmission with the bus such as transmit equalizers, receiver equalizers and clock generation circuit elements. For example, such clock generation circuit elements may include oscillators, phase lock loops, delay lock loops, phase mixers, etc.

The transmitter 104 will also typically include an encoder 108. The encoder 108 is configured to selectively modify or encode the data to be transmitted (e.g., $DQT_0, DQT_1 \ldots DQT_n$) to permit transmitter 104 to transmit encoded data signals (e.g., $DQC_0, DQC_1 \ldots DQC_n$). Encoding the data to be transmitted into encoded data signals for the bus can, in some embodiments, improve an energy characteristic of the transmission of the data on the bus by, for example, decreasing the demands on the power delivery network. Thus, encoding may be implemented to reduce any or all of the current, voltage or power, etc. required to transmit the data on the bus. For example, in some situations, transmitting encoded data signals may involve less noise and/or less power than transmitting the data signals to be transmitted without encoding.

For example, the circuits of the encoder 108 may be implemented with an inverter in a data bus inversion circuit to implement a data bus inversion coding scheme, such as a toggle, flag, or polarity bit inversion scheme. In such an embodiment, data of data signals to be transmitted (e.g., $DQT_0, DQT_1 \ldots DQT_n$) may be selectively inverted before being driven to the channels of the bus 106 as encoded data signals (e.g., $DQC_0, DQC_1 \ldots DQC_n$). This may be accomplished by an inversion process. In such a process, each data bit and an inverted version of the each data bit may be applied to one or more multiplexers that are controlled by an encoding control signal. The encoding control signal controls the multiplexer to select between the inverted versions of the data signals or the uninverted versions of the data signals. For example, in a binary system, transmission of low signals that may be associated with a logical "0" on a bus may require more energy than transmitting a high signal that may be associated with a logical "1". In such a case, by reducing the number of data bits that are transmitted as low signal states such that these signals are instead transmitted as high signal states, the encoding can reduce the energy of the bus. An encoder that implements data bus inversion in such a case may change the data bits of a common unit interval for all of the lines of the bus to reduce the number of logical lows by inversion of the data bits. The inverted data bits are then transmitted as encoded data signals. Other embodiments of the encoder of the data system 102 may employ circuits that encode data to be transmitted by more complex encoding schemes other than a simple data bus inversion scheme.

Typically, an encoding control signal (shown as EC in FIG. 1) from the detector 114 controls the encoder. The control signal sets encoding implemented by the encoder. The state of the encoding control signal in a particular unit interval indicates whether or not the data signals of the bus in a corresponding data interval or unit interval are to be encoded. For example, the control signal may be set high to indicate that inverting should be employed by the encoder for data to be transmitted in the present unit interval. Similarly, the control signal may be set low to indicate that inverting should not be employed by the encoder for data to be transmitted in the present unit interval. This may be understood as active high encoding. Alternatively, the encoding control or bus invert control signal may indicate inversion if the control signal is a low signal. This may be understood as active low encoding. The control signal may also be transmitted on the bus by a driver or drivers (not shown in FIG. 1) of the transmitter 104. The signal level of the control signal in any given unit interval of the bus represents the encoding state of the data transmitted on the bus in the same unit interval. This transmission may, for example, be accomplished by using a common transmission clock for transmitting the control signal and the data signals. Thus, the encoding control signal may also be utilized to control elements of a receiver on the bus.

The data system 102 may also include a receiver 110. The receiver 110 receives the signals from the lines of the bus 106. For example, the receiver may include a plurality of slicers (not shown in FIG. 1) to sample the analog values of each successive unit interval of the signals on the bus 106 and to produce digital values by comparison of the sampled value with a threshold. These produced digital values (e.g., received encoded data signals shown as $DQRC_0, DQRC_1 \ldots DQRC_n$) will typically be the same as the data of the transmitted encoded data signals (e.g., $DQTC_0, DQTC_1 \ldots DQTC_n$). Similarly, one or more slicers may produce the encoding control signal (e.g., EC) received in the receiver 110.

Moreover, the receiver 110 will typically include a decoder 112. Decoder 112 is configured to selectively modify or decode the received encoded data signals (e.g., $DQRC_0, DQRC_1 \ldots DQRC_n$) to produce received data signals (e.g., $DQR_0, DQR_1 \ldots DQR_n$). Typically, the data of the data signals to be transmitted (e.g., $DQT_0, DQT_1 \ldots DQT_n$) will be the same as the received data signals (e.g., $DQR_0, DQT_1 \ldots DQR_n$). Thus, the decoder 112 will complement the encoder 108. For example, if the encoder 108 implements inversion of the data of the data signals to be transmitted, the decoder 112 will implement inversion of the data of the received encoded data signals. Similarly, other decoders may be implemented to decode the transmitted encoded data in the event that other encoding schemes are implemented in the data system 102. Typically, the encoding control signal (EC) received by receiver 110 may be implemented to control the decoding by the decoder 112 for each unit interval as appropriate.

Figure 2:
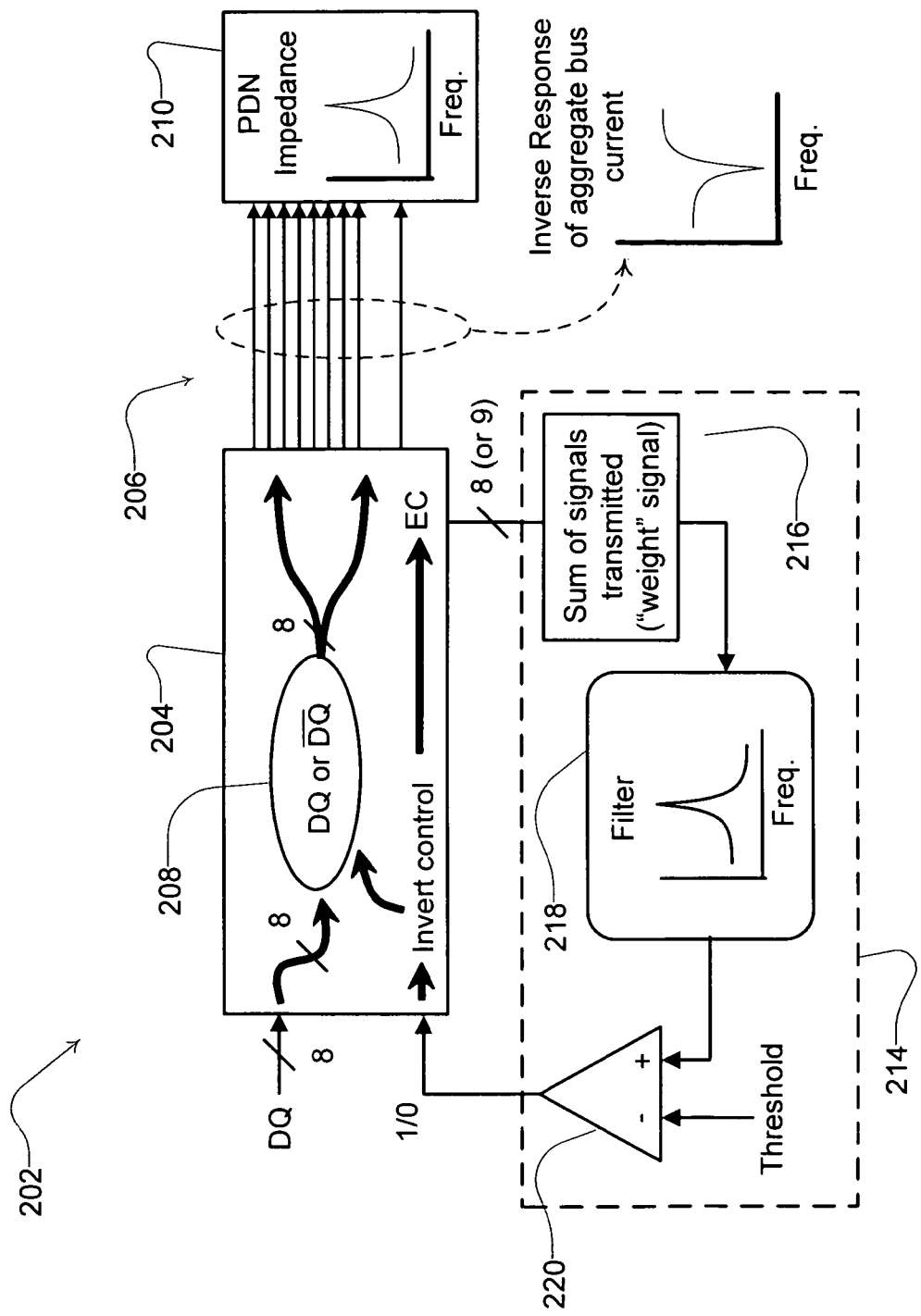
FIG. 2 is a diagram illustrating an example data bus inversion coding embodiment of the present frequency-based coding technology.

An embodiment of such a data system 202 implementing frequency-based bus encoding technology is illustrated in FIG. 2. The present embodiment may be used with any of the examples introduced above (e.g., to avoid RF interference with other nearby devices, or to implement other criteria, such as avoiding a bus switching excitation frequency that coincides with the resonant frequency of the system power delivery network. For this purpose, the depicted embodiment determines a power-related measure for data of the bus in the detector. Such a power-related measure may be a Hamming weight. The power-related measure may be determined as the weighted sum of the transmitted bits multiplied by the power of the respective symbol. The summed bits may include the transmitted data as well as any invert control bit and may even include any other control or addressing bits that are transmitted on the bus.

In this embodiment, eight (8) data lines on the bus 206 are illustrated. However, the system may also be implemented with fewer or additional data lines. Moreover, while only a single control line for the encoding control signal is illustrated, the system and bus may also implement other control or addressing signals. In the embodiment of FIG. 2, a transmitter 204 includes an encoder 208 that implements a data bus inversion coding scheme. A receiver 210 seen in FIG. 2 may be similar to the receiver introduced in connection with the embodiment of FIG. 1.

The detector 214 includes a summer 216, a filter 218 and an encoding control set element such as a comparator 220. Although the filter is illustrated as a band-pass fitter it may be implemented as a low-pass filter. The summer 216 predicts an aggregate current of the bus 206 by summing together signals representing the bits of data (e.g., $DQT_1 \ldots DQT_n$) to be transmitted at each unit interval and by inputting the output of the summer to the filter 218.

The transfer function of the filter 218 may be of the form of a band-pass filter with a center frequency at or near a resonance frequency of the system and/or a frequency band. For example, the band-pass filter may be centered near the peak resonance of the power supply distribution network or the peak gain of a phase locked loop, or for one or more other specific frequencies or frequency bands. In the example of FIG. 2, the output of the band-pass filter is a signal representing bus switching noise at the undesired frequency range represented by the filter. The output of the filter 218 is applied to a comparator 220. A comparison of the output of the filter 218 and a threshold in the comparator 220 will then produce an encoding control signal to control inversion by the encoder 208 according to the desired encoding scheme. For example, the output of the band-pass filter can cause the encoder 208 to invert the logic states of each line of the bus 108 (i.e., Data Bus Inversion or DBI). The threshold signal used at the input of the comparator 220 may be dynamically varied, for example, to effectuate a weight measure based on a sum of incoming, unencoded bits. With such a changing of the "weight" of the aggregate current as a function of detected frequency of the predicted current, the spectral content of the bus may be shaped in a different manner when compared to a system without the detector.

Figure 3A:
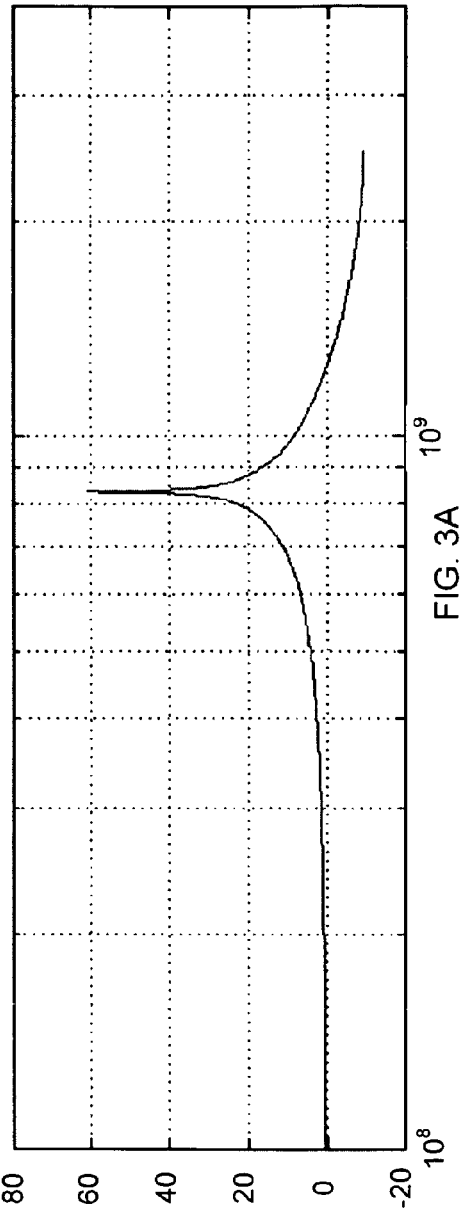
FIGS. 3A and 3B are graphs respectively illustrating a frequency response and inverse frequency response of an example filter that may be implemented with a detector of the present technology.
Figure 3B:
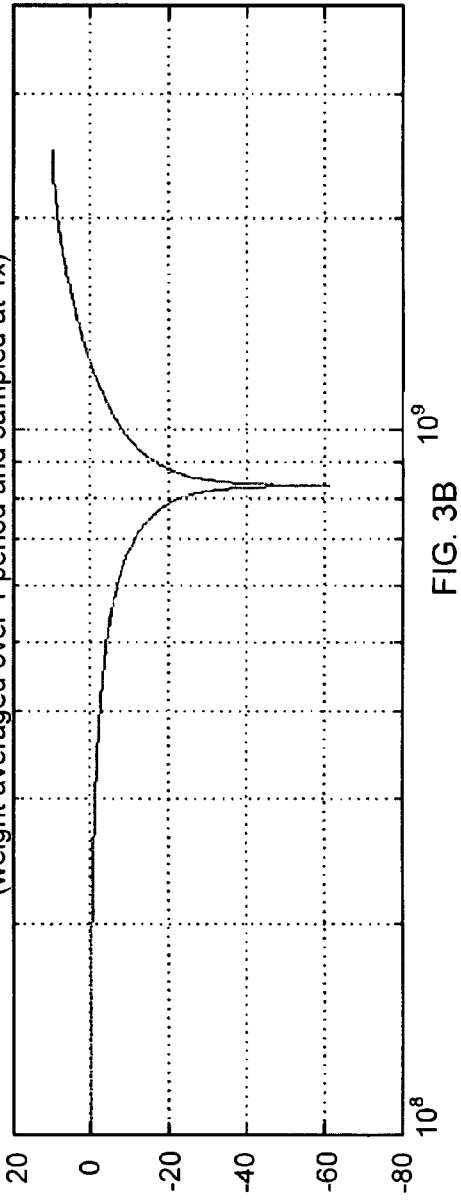
Figure 5:
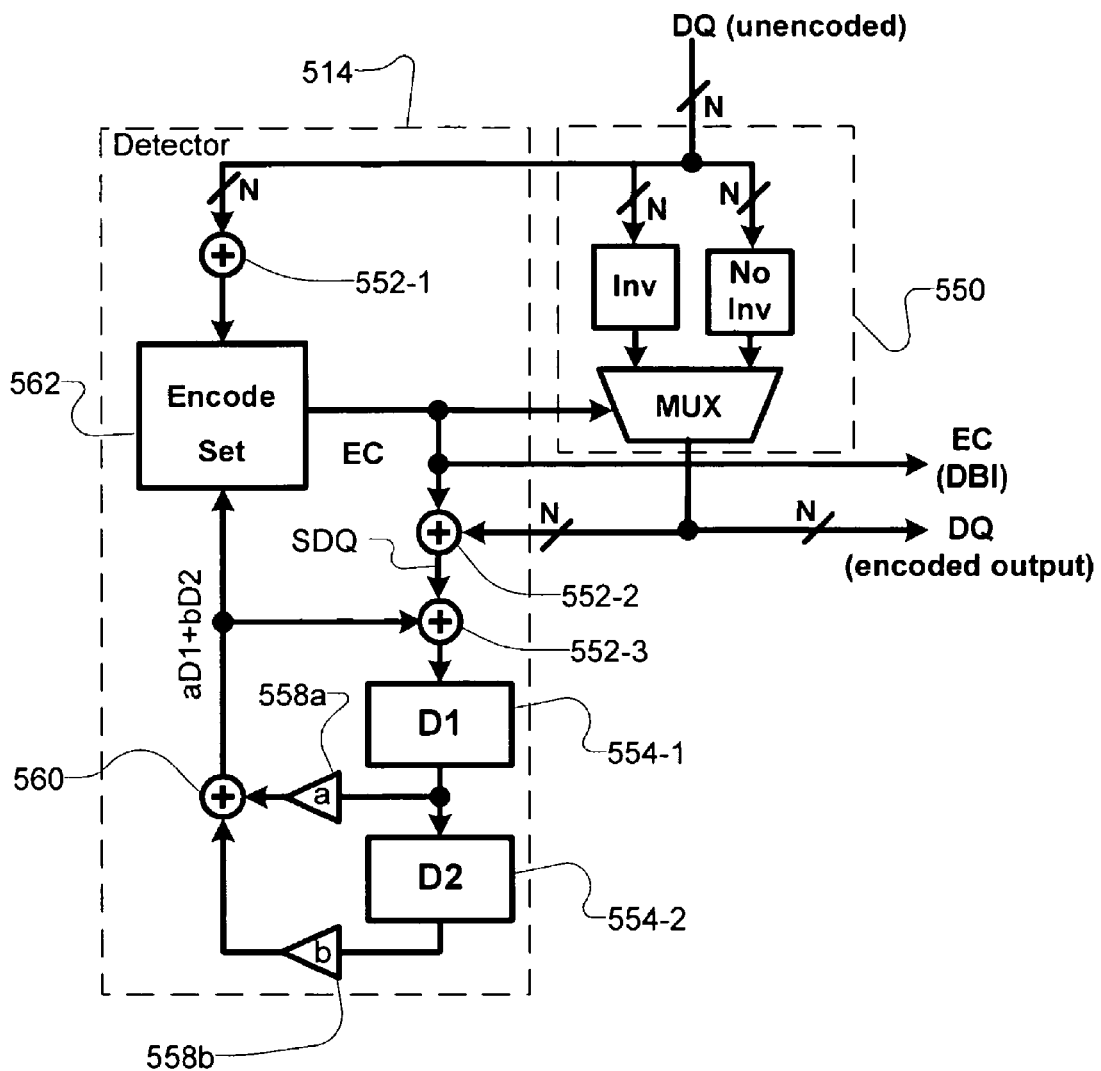
FIG. 5 is a block diagram illustrating elements of a frequency-based detector of the present technology.

An infinite impulse response filter ("IIR"), such as the example illustrated in FIG. 5 and explained in more detailed herein, may also be suitable for the embodiments of the detector of the present technology. Such a filter may be implemented as an analog or digital element of the circuit. The filter may accumulate scaled values of the history of the bus output weight (e.g., based on summing multiple unit intervals of the currents of the bus lines) to make the frequency-based bus coding or inverting decision. The plot in FIG. 3A illustrates a frequency response of an example 3-tap filter structure (2 coefficients with a delayed output history) that may be implemented in the feedback loop of an embodiment of the detector previously described. The graph of FIG. 3A represents a frequency response of a band-pass filter. The graph of FIG. 3B represents an inverse of the frequency response of FIG. 3B. These plots illustrate a system that could be based on a data rate of 5 Gbps, with the output of the filter sampled at Fs=5 GHz. The example IIR band-pass filter may be described by a transfer function as follows:

$$H(z) = \frac{1}{1 - a \cdot z^{-1} + b \cdot z^{-2}}$$

Setting the coefficient values of "a" and "b" to appropriate values may adjust the center frequency of the filter to a desired frequency. For example, one possible way to shift the center frequency of this filter is to adjust the "a" filter coefficient. A solution for placing the center frequency precisely may be determined with the equation, "a=2*cos(Fr/Fs)", where Fr is the resonance frequency of a system and Fs is the sampling frequency of the filter.

Figure 4A:
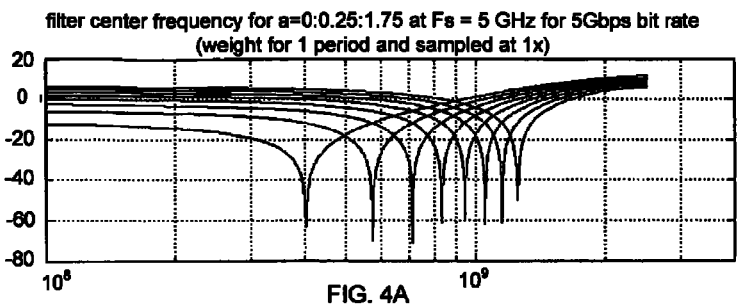
FIGS. 4A, 4B, and 4C each plot the inverse of various filter frequency responses of example detectors of the present technology.
Figure 4B:
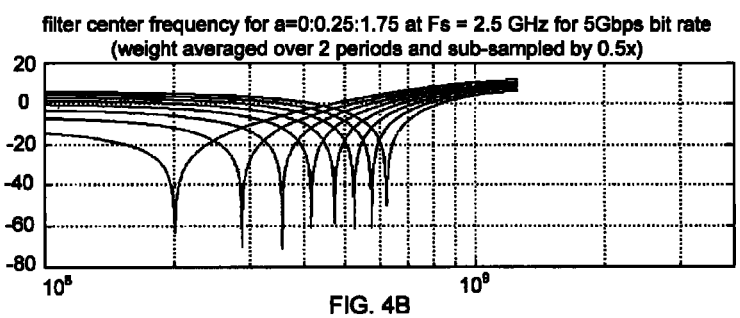
Figure 4C:
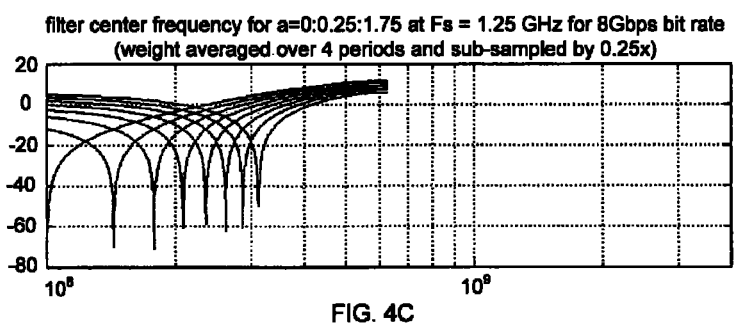

For example, placing the notch of the filter precisely at frequencies much lower than Fs may be sensitive to the value of "a". Given this, and the fact that the resonance frequency of a system is typically much lower than the sampling frequency, a sub-sampling or decimation approach could also be used to reduce the sensitivity of the fitter design. As graphically depicted in FIGS. 4A, 4B and 4C, by modifying the filter coefficients and/or the sampling rate of the filter, the filter of the detector may be constructed to have a chosen frequency response for the bus of a system to avoid undesirable energy characteristics in the bus. FIGS. 4A, 4B and 4C each plot the inverse of the frequency responses for the example filter with different values for the "a" coefficient of the filter transfer function. Each curve is based on a value of the "a" coefficient in the range of 0 to 1.75 in steps of 0.25, with the sampling rate at Fs, Fs/2, and Fs/4 respectively.

Using a sub-sampling approach can permit an easier placement of the notch at lower frequencies. The ½ X sub-sampling approach would average adjacent weight values (in time) in a digital and/or analog implementation and set the encoding control (EC) based on this stream. The use of sub-rate sampling and additional taps is a suitable approach in a digital implementation. However, a mixed-mode implementation would have the option of analog tuning for placement of the filter center frequency. A still further option for tuning of the center frequency would be to additionally have some control over the on-chip bypass capacitance.

For example, the detector of the system may have a programmable filter capable of being tuned for at least one of several possible frequency responses. In such a system, coarse coefficients adjustments may be made such as in a digital filter implementation. If the bus of the system is also implemented with a programmable on-chip bypass capacitance, the resonance frequency of the PDN may be adjusted during system performance by adjusting the on-chip bypass capacitance. In conjunction with such changes to the PDN, the detector may also be adjusted in such an embodiment so that the desired frequency response of the detector will still have the desired frequency response relative to the adjustments made to the on-chip bypass capacitance and the resonant frequency of the PDN. As alluded to earlier, the filter may also be implemented in a multi-modal manner, with preprogrammed modes being selectively or dynamically set during device operation.

FIG. 5 illustrates another embodiment of a detector with an example digital filter that may be implemented in the frequency-based encoding control of the present technology. The detector 514 includes an invert or pass element 550, one or more delay elements 554-1, 554-2 (also shown as "D1" and "D2" respectively in FIG. 5), one or more amplification elements 558a, 558b (also shown as "a" and "b" respectively in FIG. 5), one or more adders 552-1, 552-2, 552-3, 560 and an invert set element 562. The filter portion of the detector generally may be viewed as including the amplification elements, the delay elements and the adders. Thus, in this embodiment, these elements of the filter portion provide the filtering function as previously described.

The invert or pass element 550 will typically be configured to modify the incoming unencoded data (shown as "DQ unencoded" in FIG. 5) so that an aggregate bus weight signal (labeled "SDQ" FIG. 5) may be generated to represent the weight that was actually transmitted on the bus. For example, unencoded data is inverted in inverter 550-1 and the unencoded data is applied to a delay element 550-2 to provide no inversion. The multiplexer 550-3 then passes the appropriate signals (encoded or not) based on the encoding control signal applied to the multiplexer 550-3 from the encode set element 562. In some embodiments, the invert or pass element may share components of the encoder or decoder of the system since they provide similar functions.

Thus, the adder 552-2 sums data signals of the bus and the encoding control signal to generate the sum that represents the aggregate current of the bus. In this way, the filter delay elements wilt obtain accurate aggregate bus weight information and thereby have an accurate history of bus transfer information.

In FIG. 5, the adder 552-1 sums data signals for use in the encoding logic decision made by the encode set element 562. The invert set element 562 generates the DBI control or encoding control (EC) signal. Based on the incoming aggregate weight signal SDQ and historical aggregate bus weight information maintained in the delay elements 554-1, 554-2 of the filter portion of the detector 514, a frequency-based bus encoding control determination will be made. As will be explained in more detail herein with respect to FIG. 6, the invert set element 562 may include one or more comparators configured to make the encoding decision.

The output signal of the adder 552-2 will be input to another adder 552-3. This adds the new aggregate bus weight signal to the output signal of the filter (shown as "aD1+bD2" in FIG. 5). This type of feedback is typical of an IIR filter. The output of the adder 552-3 is applied to a first delay element 554-1 (D1). The first delay element may typically include a register or other data store or latch element to hold the input value for at least one unit interval. Output of the first delay element 554-1 is applied to the second delay element and to first amplification element 558a. The second delay element may also typically include a register or other data store or latch element to hold the input value for at least one unit interval. The first amplification element applies a gain corresponding to a coefficient of the filter such as an "a" coefficient of any of the filter transfer functions previously mentioned.

The output of the second delay element 554-2 (also shown as D2) is applied to a second amplification element 558b. The second amplification element applies again corresponding to a coefficient of the filter such as a "b" coefficient of any of the filter transfer functions previously mentioned. The output signals of each of the amplification elements are applied to adder 560, which produces the filter output signal (shown in FIG. 5 as "aD1+bD2") which, is input to the invert set element 562. In this embodiment, although two delay elements and two amplification elements are illustrated, additional or fewer such elements may also be implemented in the filter portion depending on the desired filter transfer function or filter transfer functions implemented in the detector based on the designed frequency response of the filter of the detector.

Figure 5A:
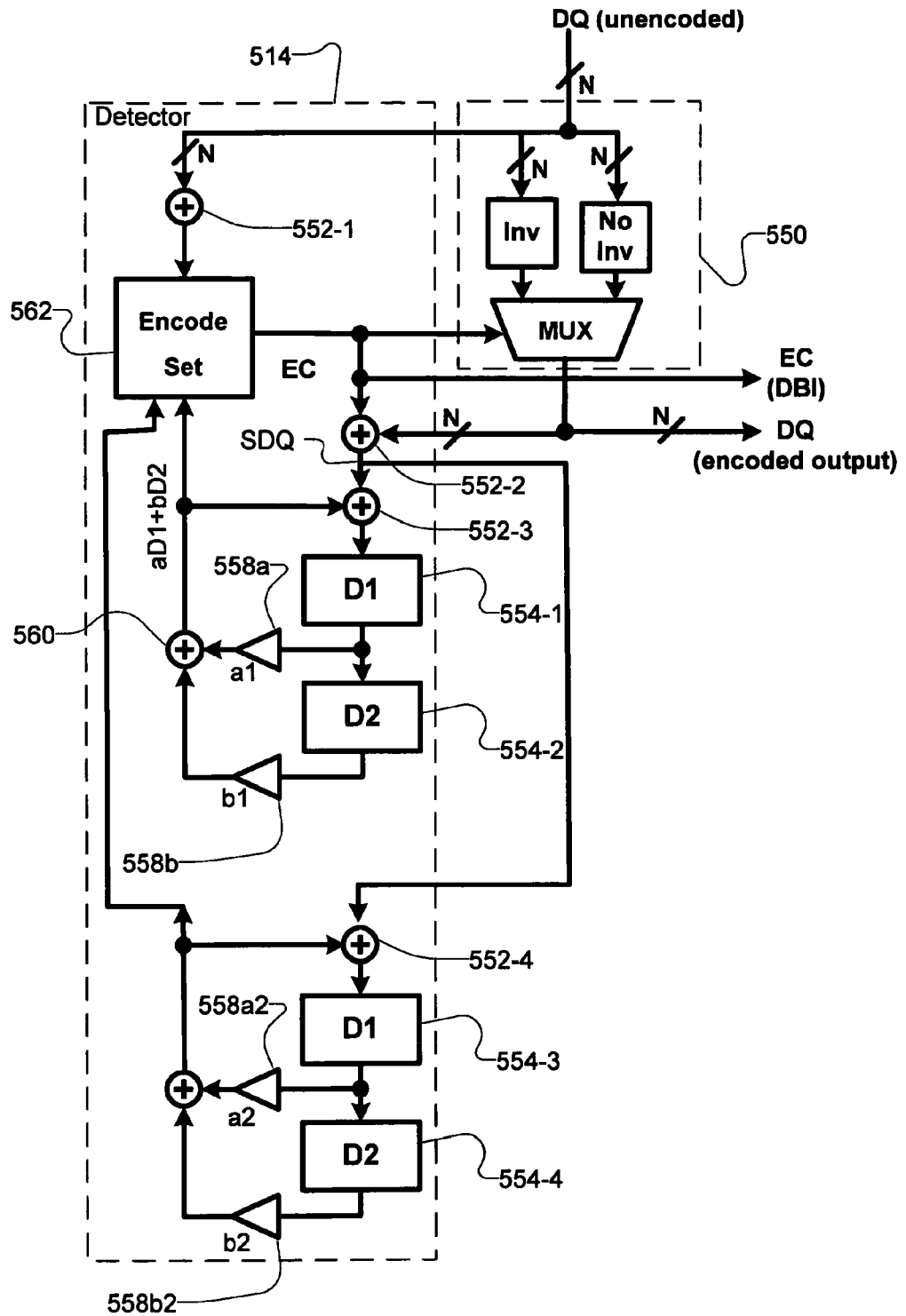
FIG. 5A is a block diagram illustrating elements of a multiple frequency response embodiment of the detector of FIG. 5.
Figure 5B:
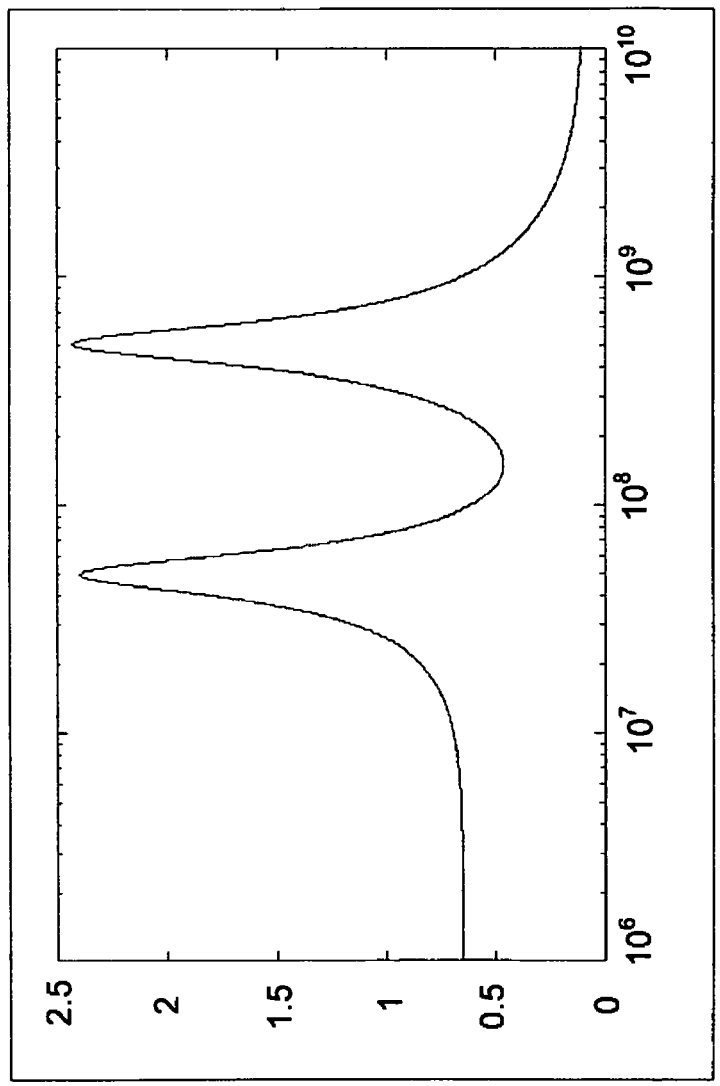
FIG. 5B illustrates a frequency spectrum for a PDN having multiple resonance peaks.

Another example detector is illustrated in FIG. 5A. This embodiment is like the embodiment of FIG. 5. However, this detector includes an additional filter portion not shown in the embodiment of FIG. 5. The additional filter portion is formed by amplification elements 558a2, 558b2, adders 552-4, 560-1 and delay elements 554-3, 554-4. The additional fitter portion permits the detector to detect additional frequencies. For example, such a detector may be appropriate to control encoding of a bus coupled with a power delivery circuit that has multiple resonant frequencies so that encoding may be implemented to avoid multiple resonant frequencies. For example, the filter portions of this embodiment may be set to detect the frequencies illustrated in FIG. 5B. The graph of FIG. 5B show an example frequency response of a power delivery network that has more than a single resonant frequency. While the embodiment of FIG. 5A implements two filter portions, additional filter portions may be added depending on the desired frequency response of the detector.

Figure 6:
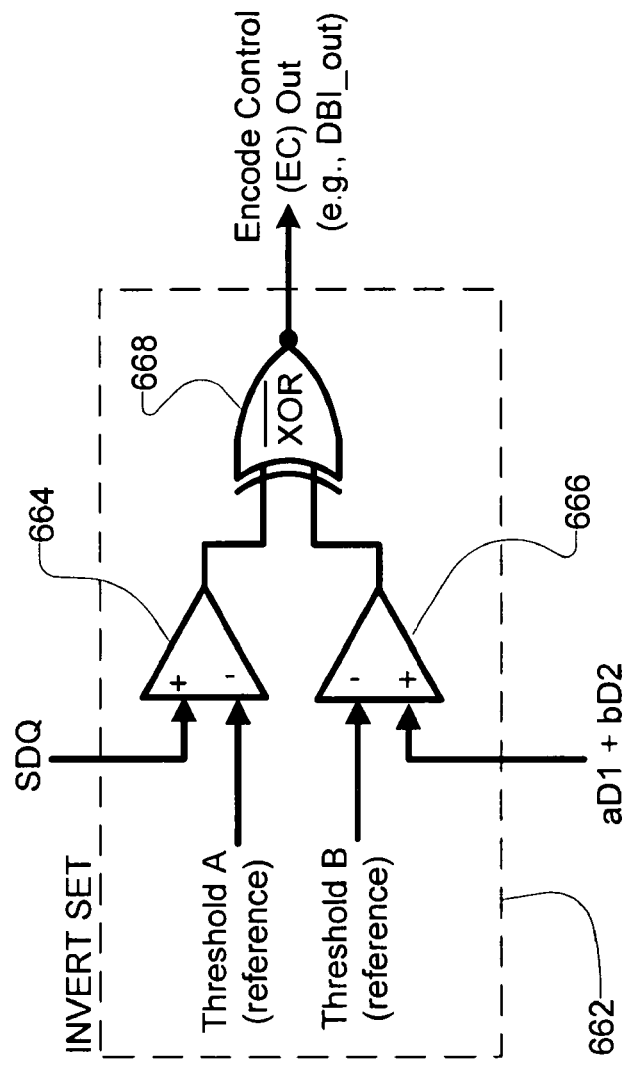
FIG. 6 is a block diagram showing elements of an encoding set or decision element of the detector embodiment of FIG. 5.

One example of an invert set element 562 of FIG. 5 is illustrated in FIG. 6. As previously mentioned, the aggregate bus weight signal SDQ is applied to a first comparator 664 in the invert set element 662. The comparator may be configured to compare the signal with a threshold (shown as "Threshold A") to assess whether coding is necessary. For example, for a DBI encoding scheme the threshold comparison may indicate inversion if the weight of the signal exceeds a desired weight (e.g., a threshold indicative of 50% of the potential aggregate current of the bus). Similarly, the output signal (shown as "aD1+bD2" in FIGS. 5 and 6) of the filter portion of detector is applied to a second comparator and also compared with a threshold (shown as "Threshold B"). Threshold B may be the same or different from threshold A and may depend on the gain attributable to the amplification elements of the filter. This comparison of comparator 666 essentially effects the subtraction of the fitter polynomial (e.g., 1-aD1+bD2) in the denominator of the filter transfer function previously described. Although analog comparators are illustrated in the example invert set element of FIG. 6, it may also optionally be implemented with digital components such as digital magnitude comparators.

The output of both of the comparators may then be applied to one or more logic gates 668, such as an XNOR gate, to set the encoding control signal as a function of the outputs of the comparators. For example, depending on the output of the filter, if encoding is needed for the next transfer, the logic gate 668 may be set high. If encoding is not needed, the logic gate may be set low.

As previously discussed, the weight of the aggregate current of the bus is predicted in one or more summers by at least summing some or all of the data bits of the data signals to be transmitted to the bus by producing the aggregate bus weight signal SDQ. Typically, the summing operation may be based on summing all or some of the signals of the bus for a given unit interval of a data clock of the system. However, in some systems, data of a common system clock unit interval may be transmitted onto the channels of the bus utilizing independent transmit clocks where the transmit clocks are not necessarily precisely in phase with each other. Such transmit clocks with different phase offsets may be implemented to account for skew between lines of the bus associated with the different times of flight of the different lines or wires of the bus so that the transmitted data arriving at the receiver will be substantially synchronized. In such a system, the determination of the aggregate weight of the bus may compensate for the delay of certain data entering the bus with the different phases of the transmit clocks. For example, the summer may sum some lines of a bus for a certain unit interval of the system clock with the remaining channels of the bus for a subsequent unit interval of the system clock where the data from these remaining lines enters the bus at a earlier time relative to the other lines due to the phases of transmit clocks of these remaining lines. In such an embodiment, the summer may be configured with registers to account for such delay so that each sum of the summer or predicted aggregate bus weight includes the data entering the bus at a common transmit time. Thus, the filter of the detector may more accurately predict the current or energy status of the bus in the case of signal skew between different lines of the bus. Furthermore, by considering the arrival time of the aggregate current at a particular point in the system (e.g., at the PDN of a receiving device), the system may optionally implement frequency-based encoding to reduce noise at a receive side of the bus based on control from the transmit side of the bus. In such a method where the detector may consider the phase skew of the individual transmitters, it may not necessarily be implemented for transmit side noise associated with the PDN of the transmitting device.

Figure 7:
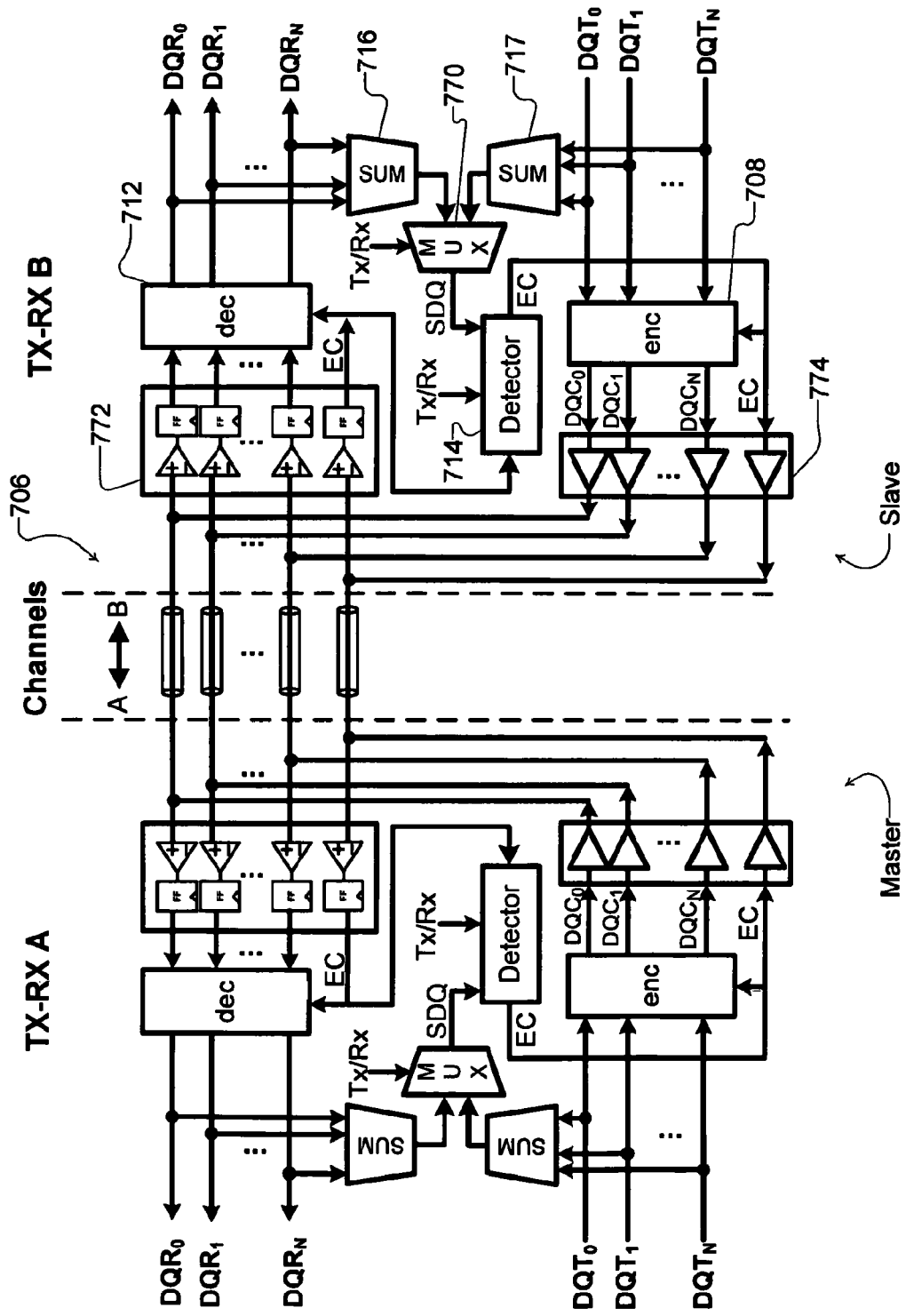
FIG. 7 is a block diagram illustrating a bidirectional bus embodiment of the present frequency-based bus coding technology, including a detector for each one of two transceivers.

FIG. 7 illustrates a data system embodiment that implements frequency-based bus encoding of the present technology for a bidirectional bus. In this embodiment, detectors may exist at opposite sides of the channels. Moreover, transceivers (shown as "TX-RX A" or "TX-RX B") may be implemented on opposing sides of the channels. In this embodiment, the history of the filters of each detector may evaluate aggregate current in the bus from data of one or more unit intervals from a prior transmission even if the detector is operating in a receive mode. Similarly, the history of the fitters of each detector may evaluate aggregate current in the bus from data of one or more unit intervals from a prior reception even if the detector is operating in a transmit mode. In other words, the history of current on the bus can be maintained in each detector for at least a time period of several unit intervals of data from the bus. In this regard, those several unit intervals may include data representative of current driven by drivers from both sides of the channel such as when a transmission from one side of the channel to the other side of the channel (e.g., A to B directional arrow shown in FIG. 7) successively changes to a transmission from the other side of the channel back to the original side of the channel (e.g., B to A directional arrow shown in FIG. 7). These transceivers may be configured to operate in a half-duplex bidirectional mode or they may be configured to operate in a full-duplex bidirectional mode. In either case, the filters of the detectors would be supplied with aggregate bus current data from the receive and transmit operations so that the filter may operate based on the history of the bus from both receiving and transmitting operations.

In the embodiment of the data system of FIG. 7, each transceiver is configured with similar elements. Moreover, each may also include receiver or transmitter elements to operate like the previously discussed embodiments. Thus, transceiver TX-RX B will have transmitter components including a block of drivers 774. The block of drivers 774 drive control information and/or data onto the bus 706. The encoder 708 encodes transmissions by a data bus inversion scheme under the control of detector 714. The detector 714 makes a frequency-based decision based on the aggregate bus weight signal SDQ. To this end, data to be transmitted is summed in summer 717 to determine an aggregate bus weight signal SDQ. However, in this embodiment, the sum from the summer 717 is first applied to a multiplexer 770 and will advance to the detector 714 depending on the mode of the transceiver TX-RX B indicated by a transceiver mode signal (shown as Tx/Rx in FIG. 7). If the transceiver mode signal indicates that the transceiver TX-RX B is transmitting data onto the bus 706, then the multiplexer 770 will permit the SDQ from summer 717 to be input to the detector 714 so that the detector 714 will evaluate data to be transmitted white in the transmit mode.

Transceiver TX-RX B also includes receiver elements. Thus, the transceiver includes a block of slicers 772 or similar sampling elements to sense the signals from the channels of the bus 706. The transceiver will also include a decoder 712 to decode data that has been received from the bus in encoded form. Decoder 712 decodes data based on the control of the encoding control EC signal received from the bus 706. Received signals from the bus that have been decoded by decoder 712 are summed in summer 716 to generate an aggregate bus weight signal. If the transceiver mode signal indicates that the transceiver TX-RX B is receiving data from the bus 706, then the multiplexer 770 will permit the SDQ from summer 716 to be input to the detector 714 so that the detector will evaluate received data while in the receive mode.

Optionally, while the aggregate bus weight signals are supplied to the detector based on received data or transmit data as just described, the detector may also be configured for an idle mode. In an idle mode, the transceiver is not operating to transmit data or receive data. During this time, the signals of the bus may have some idle value. An additional summer component (not shown) may be implemented to provide an SDQ signal for the idle mode to the detector. In such an embodiment, the SDQ entering the detector during the idle mode may represent the aggregate current of the bus by summing the idle values of the bus. In this way, the history of the filter of the detector may more accurately represent the history of the aggregate current of the bus.

For example, during an idle period, the transceivers of the bus may transmit "dummy" or "dead" data. This could be handled by using a mask signal when transmitting from a transceiver on one device such as on a controller to a transceiver on another device such as a memory or DRAM. This dummy or dead data may be easily ignored when transmitting from the memory or DRAM to the controller since the controller determines which periods are idle. Alternatively, the controller could issue a command over the command and address bus to let the DRAM or receiving element know what data to ignore. By permitting the idle period data to enter the filter and allowing the resulting signals to be transmitted on the bus can help to avoid step changes in operation that could induce very large switching noise.

Also, during tong idle periods, the controller may optionally be configured to filter a particular number of periods of the transmitted idle data, and then gradually reduce the aggregate signaling current of the bus by slowly setting transmitters to a low-power IDLE mode in a manner that is aware of the frequency response of the system. Essentially, a post-amble may be implemented for this purpose that is based on a frequency aware encoding scheme.

Optionally, the controller may also be configured to gradually ramp up to a specified operating condition for the bus at the end of an idle period to reduce initial condition transients. Essentially, a pre-amble may be implemented to accomplish this based on the frequency aware encoding scheme.

Figure 7A:
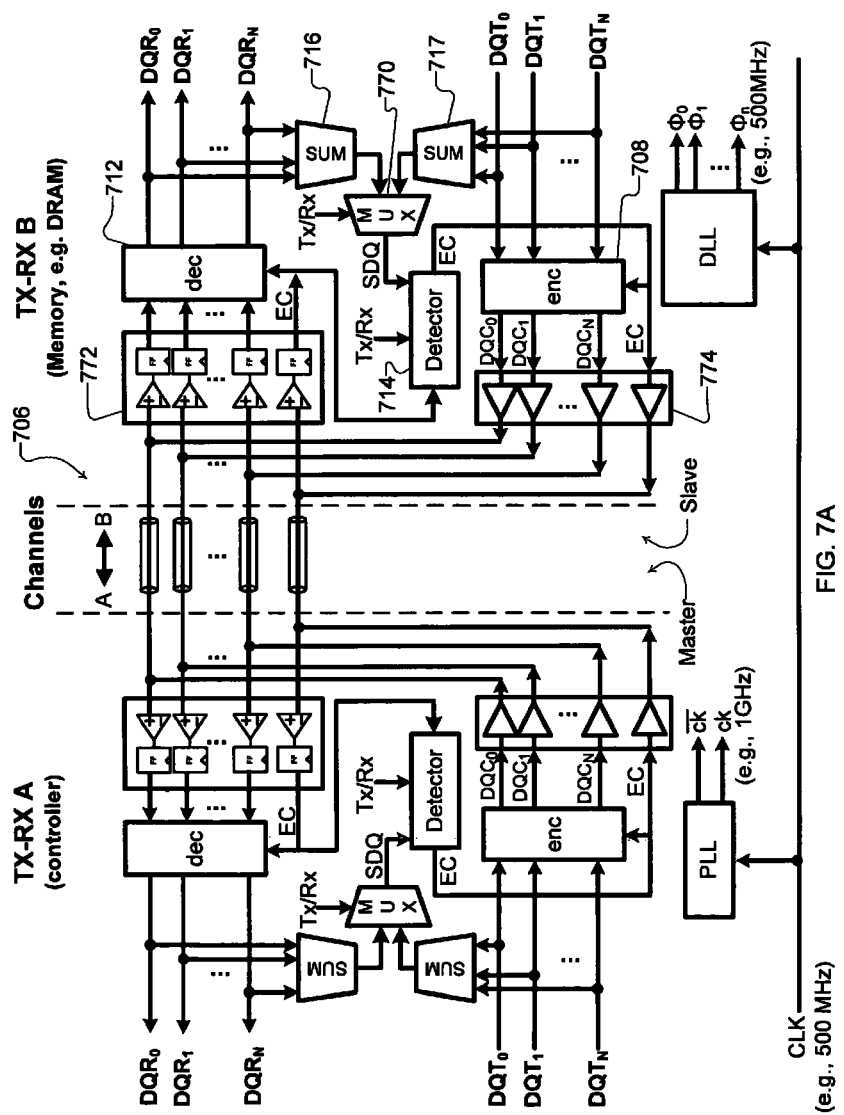
FIG. 7A is a block diagram illustrating a bidirectional mesochronous memory system embodiment based on the components of FIG. 7.
Figure 7B:
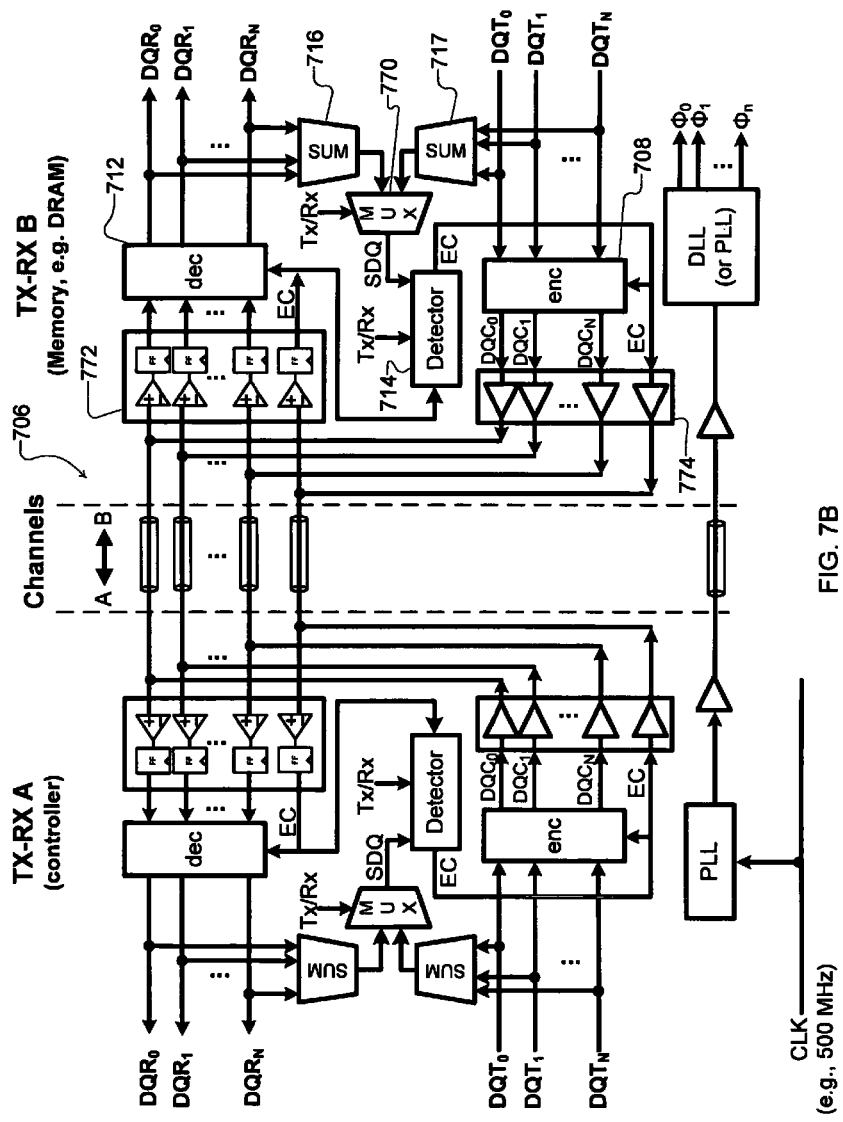
FIG. 7B is a block diagram illustrating a clock forwarding embodiment based on the components of FIG. 7.
Figure 7C:
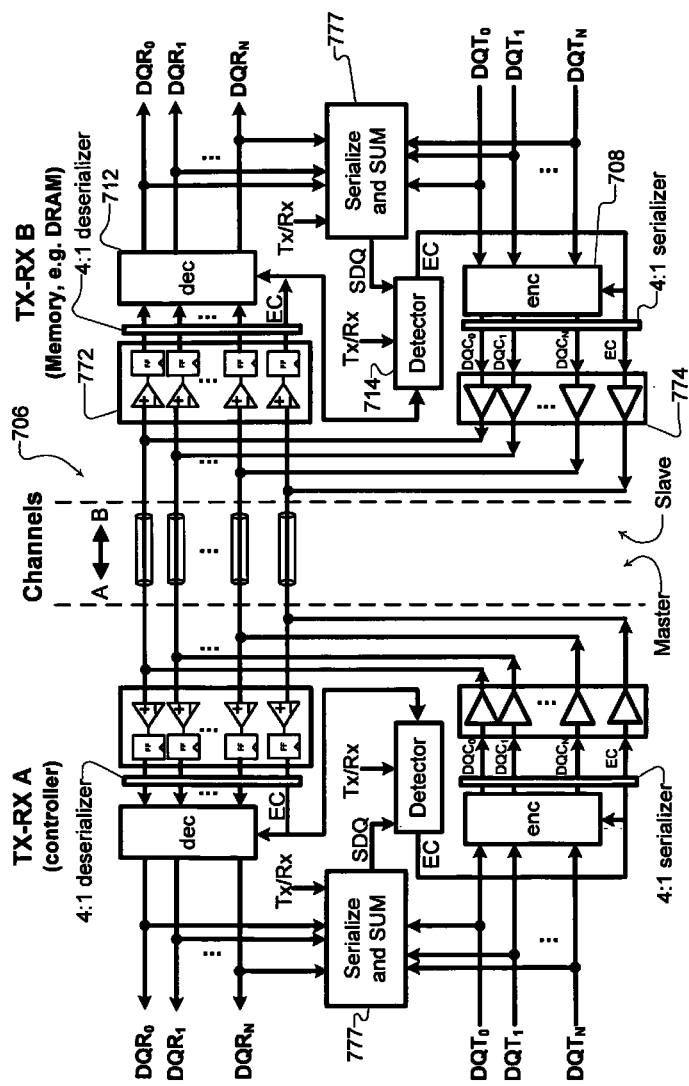
FIG. 7C is a block diagram illustrating a parallel codec embodiment with serializers and deserializers based on the components of FIG. 7.

FIGS. 7A, 7B and 7C illustrate various systems based on the components implemented in the embodiment of FIG. 7. In FIG. 7A, the components are implemented as a mesochronous memory system. As illustrated, the power delivery network includes timing components such as a phase lock loop element (PLL) and a delay lock loop element (DLL). The PLL on the controller side of the bus synchronizes operation of the components on the controller side of the bus. The DLL on a memory side of the bus to synchronizes operation of the components on the memory side of the bus. The characteristic frequencies, such as loop bandwidth or other frequencies, associated with the operation of the DLL and PLL may also be designed into the frequency responses of the detectors of the system. Thus, the encoding control of the system may avoid noise associated with these timing components near the characteristic frequencies of these timing components. Similarly, the detector of the clock forwarding memory system shown in FIG. 7B may also be configured to filter frequency dependent noise associated with its timing components.

The embodiment of FIG. 7C is a parallel codec. The system employs serializers and deserializers in the transmission of data on the bus. For example, for a system that has a data through-put of sixteen bits (i.e., sixteen bit wide processing) per unit interval at the controller or at the memory such that sixteen bits are processed in parallel, the system may transmit the data serially on the bus between the memory and controller. In such a serial transmission example, a four bit wide data bus may be utilized to transmit the sixteen bit data but over the course of four unit intervals on the bus (the unit interval of the controller being four times the unit interval of the bus, in this example). For such a system, the sixteen bits of data would still be processed by a detector. However, the data would be processed in one or more detectors in the manner that would permit encoding control based on serialization scheme of the bits that are transmitted on the bus. Thus, in the example, the 16 bits in a detector would be summed four bits at a time and processed by the detector in the order and timing that that each group of four bits would be transmitted on the bus. This may be accomplished by additional components in the system. For example, a serialize and sum element 777 may be implemented. Such an element would perform the functions of summers 716, 717 and multiplexer 770 but with fewer bits in each unit interval based on a serialization of data by a serializer that operates according to the transmission scheme of the bus. In such a case, the detector may operate at the clock rate of the bus. Other components may be utilized to implement the input of data to one or more detectors in the serialized manner that it is transmitted on the bus.

Figure 8:
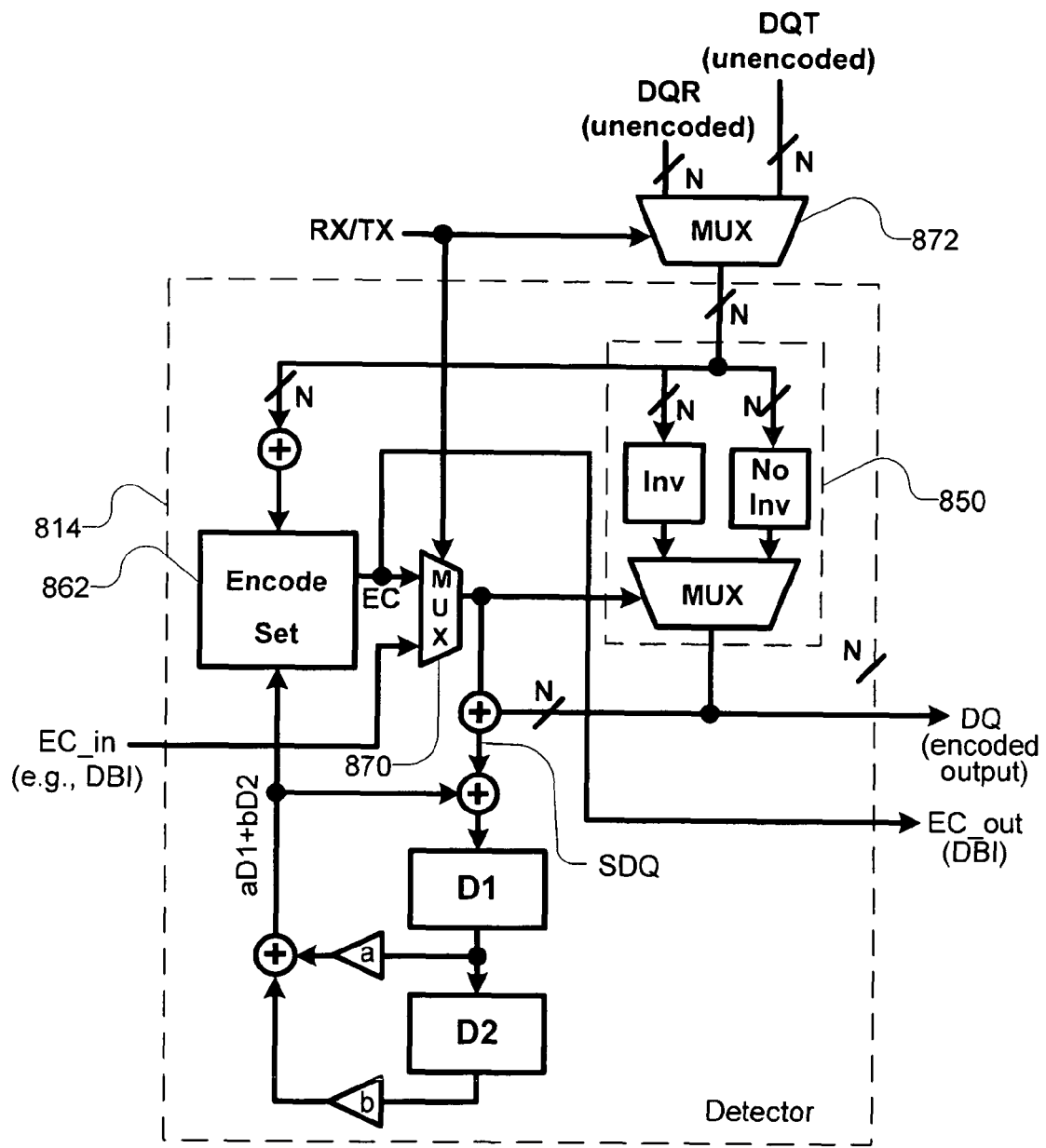
FIG. 8 is a block diagram of an example detector that may be suitable for implementation with the bidirectional bus embodiment of FIG. 7.

FIG. 8 illustrates an example detector 814 that is suitable for use in a transceiver in the embodiment of FIG. 7. Although, in this embodiment, the detector includes components for deriving the sum of the aggregate current of the bus (e.g., SDQ). The detector includes elements that have an operation comparable to that of the detector illustrated in FIG. 5. However, in this embodiment, a multiplexer 870 is added so that the detector may selectively utilize an appropriate encoding control signal depending on the mode of the transceiver. To this end, the multiplexer 870 is controlled by the transmit or receive mode signal (shown as RX/TX in FIG. 8) like that of FIG. 7. The output of the multiplexer 870 permits the incoming unencoded data signals to be modified in the invert or pass element 850 depending on whether transceiver A or transceiver B transmitted the data on the bus. Thus, if the transceiver with the detector is in transmit mode, the multiplexer 870 will utilize the encoding control signal from the invert set element of this detector 814. However, if the transceiver is in receive mode, the multiplexer 870 will utilize the encoding control signal (shown as "EC_in") that was received from the bus and generated from an invert set element from another detector (not shown in FIG. 8) on an opposite side of the bus. Thus, the output of the invert or pass element 850 will permit the aggregate bus weight signal to reflect the aggregate weight of the bus before being applied to the history of the filter. Moreover, the aggregate weight of the bus will reflect the data being transmitted or the data being received depending on the transmit or receive mode of the transceiver.

In addition, in this embodiment, a multiplexer 872 may also be implemented to apply either the unencoded received data signals (shown as DQR) or the unencoded transmit data signals DQT to the invert or pass element 850 depending on the mode of the transceiver. To this end, the transmit or receive mode signal RX/TX controls the multiplexer 872. Thus, the unencoded received data signals DQR may be applied to the history of the filter portion of the detector when the transceiver is in a receive mode. Similarly, the unencoded transmit data signals DQT may be applied to the history of the fitter portion of the detector when the transceiver is in a transmit mode. Alternatively, in the event that the transceiver is configured for full duplex operations, the multiplexer 872 would not be necessary. Rather, both the unencoded received data signals DQR and the unencoded transmitted data signals DQT would be encoded based on their respective encoding control signals. These encoded data signals would then be jointly summed and applied to the history of the filter portion of the detector. In this event, the transmit or receive mode signal RX/TX would not be necessary.

Figure 9:
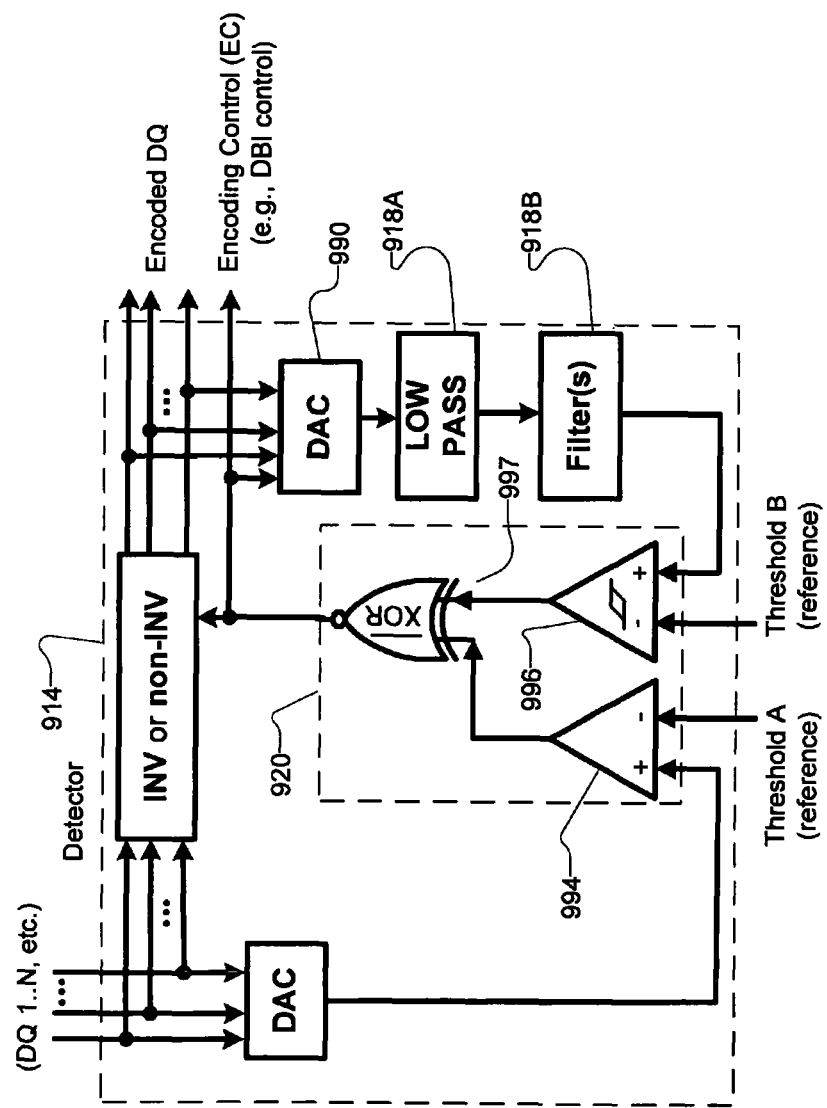
FIG. 9 is a block diagram of another example detector, namely, one having an analog filter.

FIG. 9 shows an exemplary detector that uses an analog filter. The analog filters of this detector are collectively configured to produce a frequency response for setting the encoding control as previously discussed. Thus, the filters may be implemented according to the exemplary transfer function(s) previously described. The detector includes a digital-to-analog converter 990 (DAC) and invert set element 920. In this embodiment, the DAC effectively sums the signals applied to the DAC and converts them to an analog output signal, either voltage or current, that represents the aggregate current of the bus. The output of the DAC is then optionally applied to a filter 918A. In this embodiment, the filter may be a low-pass filter or tow-pass ripple filter. This filter may, for example, be a resistor-capacitor filter. In such an embodiment, the low-pass filter may have a cut-off frequency that is sufficiently low to remove ripple from any high-frequency switching of the system. This may be useful in the event that an active analog block will subsequently process the filtered sum signal. For example, a cut-off frequency of Fs/2 may be reasonable where Fs is the data rate of the digital data of the system. This may be set at design time. However, the cut-off frequency should typically be set high enough to avoid interfering with the frequency band that the system is being designed to avoid.

The output of filter 918A is then applied to another filter or filters 918B. This set of filters is designed to remove energy in the desirable frequency band(s) and leave or allow energy in the undesirable frequency band(s) to pass. This removal of energy tailors the output of the filters so that the set of filters senses/detects energy in the undesired band(s) to then make an encoding decision in response to its detection. The filters may be passive and/or active. Active filters could be continuous time filters using amplifiers (e.g., Vg, Ig Gm, etc.). Active filters could also be switched capacitor based, such as a low-Q biquad filter, high-Q biquad filter, etc. As previously discussed, the filter(s) may even be implemented with a programmable bandwidth/frequency response, quality factor ("Q"), etc. so that the filter may be set dynamically depending on changes in the PDN such as due to dynamic on die termination changes or the failure of a bypass capacitor on the system main board.

The output of filter(s) 918B is applied to invert set element 920 which is similar to the invert set element of prior embodiments. This element includes comparators, such as a Schmitt Trigger. The Schmitt Trigger comparator 996 compares the output of filter 918B to a threshold such as a voltage reference. This comparator 996 performs the subtraction of the denominator of the polynomial of a transfer function such as the transfer function previously described. This operation is comparable to the function of comparator 666 of FIG. 6 as previously described. The comparator 996 may have hysteresis to reduce sensitivity to noise, which might cause glitches. For example, when the strength of the output of filter(s) 918B exceeds the threshold, the comparator 996 produces a true level (e.g., "1" or high). Otherwise the comparator 996 may produce a false level (e.g., "0" or low). Another comparator 994 compares an aggregate current signal SDQ to a threshold like the comparator 664 of FIG. 6.

The output of the comparators are then added in adder 997. The sum is then applied to the sampler 992. The sampler 992 samples the sum of the comparator outputs at times associated with a clock signal that may have a frequency and phase of the data rate clock of the system such that its encoding control signal output corresponds with each unit interval for data driven to the bus.

Figure 11B:
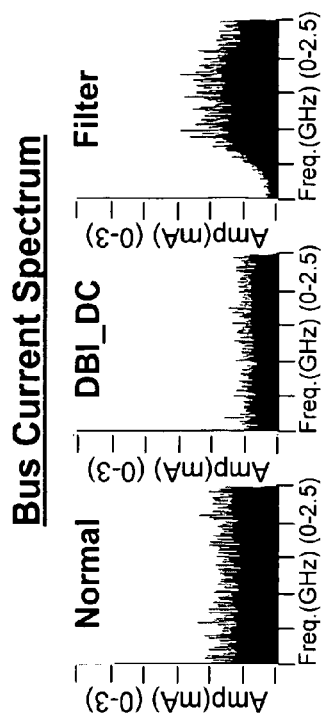
FIGS. 11A and 11B illustrate a bus spectrum analysis comparing simulations of a bus of the present technology with a bus having encoded and non-encoded technologies.
Figure 11B:
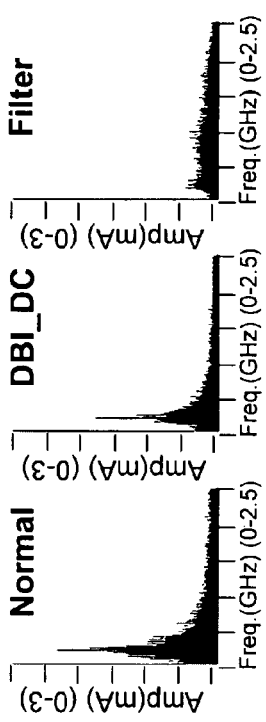
Figure 11A:
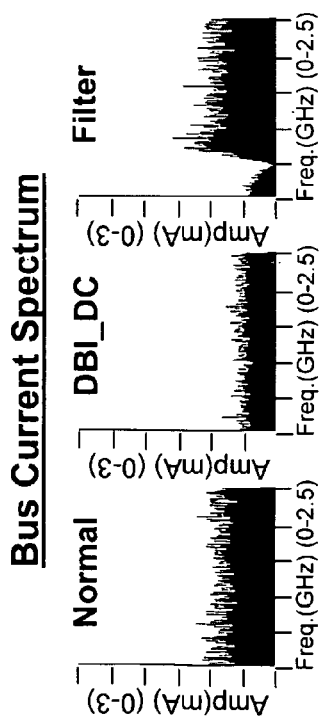
Figure 11A:
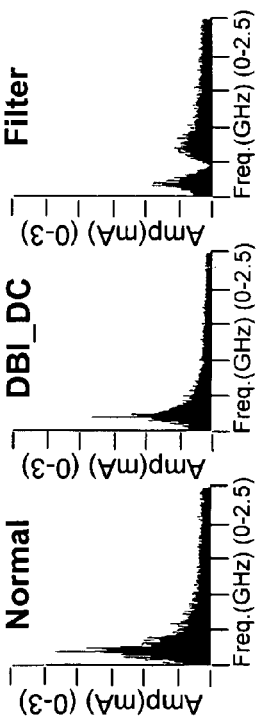

A simulated performance of a digital filter embodiment of the present frequency-based bus encoding technology compared to other conventional technologies is illustrated in the graphs of FIGS. 11A and 11B. The simulated performance of the present technology (labeled as "Filter" in FIGS. 11A and 11B) was compared to simulated performances of a data system that does not implement any bus coding (i.e., no coding) (labeled as "normal" in FIGS. 11A and 11B). The simulated performance of the present technology was also compared to a simulated data system that utilizes a conventional low-weight encoding technique (labeled FIGS. 11A and 11B as "DBI_DC"). A Matlab simulator was used. The Matlab simulation results show that an embodiment of the present frequency-based bus encoding technology may be capable of providing more that twice the performance enhancement that a conventional bus inversion encoding technique may provide.

Figure 10:
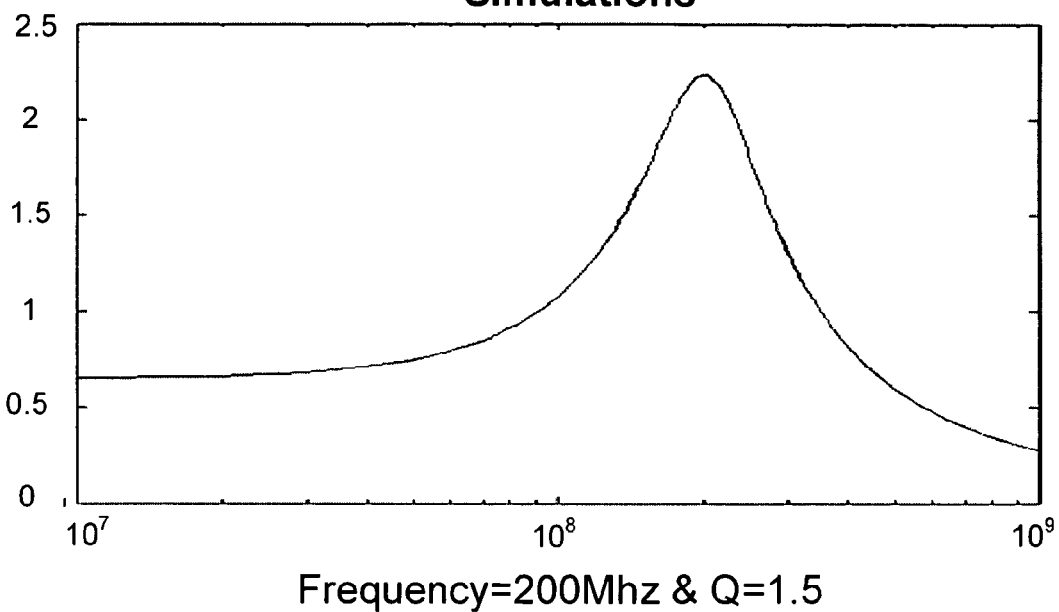
FIG. 10 is a graph of an example bus impedance function that was used for comparing technologies in the simulations graphed in FIG. 11; the impedance function shows a simulated resonance.

For the simulation, a model for the power delivery network was fit to an impedance curve illustrated in FIG. 10. The elements in this model were then scaled by a factor of 5× to account for the fact that it was being excited by only a single byte width of drivers rather than four bytes width of drivers plus command and address drivers. This model utilized a Q=1.5 and resonance frequency of 200 MHz.

As shown in FIG. 11A, the performance of the "Normal" operating bus and the "DBI_DC" operating bus were compared to an example data system of the present technology using a 3-Tap IIR filter having an Fs of 5 GHz filter. A second comparison of the "Normal" operating bus and the "DBI_DC" operating bus against an example data system of the present technology using a 4-Tap IIR filter having an Fs of 2.5 GHz was made. This comparison is illustrated in the drawing of FIG. 11B. The bus current spectrums and the induced power delivery network voltage spectrums of each system were compared. The operation of each system was based on 5 Gbps 8-bit wide PRBS data bus patterns that were 16383 bits in length. The aggregate weight of the simulated current of the bus also included the weight of an encoding control bit determined by the simulated detector.

During the simulations illustrated in FIGS. 11A and 11B, the peak-to-peak induced voltage was observed and used a comparison metric. In addition, the average power consumption for each case was recorded. Another metric of interest was the encoding latency of the various encoding methods. The DBI_DC encoding system requires at least 1 full-rate cycle for encoding. The frequency-based encoding system of the present technology has a similar latency since it evaluates the weight of the current state to compare with the accumulated history of the weights of the current to make a decision about encoding the data. Table I below compares some performance metrics for the simulated systems.

TABLE I

| | Bus Induced Voltage on PDN | Bus Average Current Consumption | Encoding Latency |
|---|---|---|---|
| No Coding | 137 mV (0 dB) | 72 mA (0%) | 0 |
| DBI_DC Encoding | 96 mV (−3.1 dB) | 59 mA (−18%) | 1 cycle |
| 3-Tap Filter Encoding @ Fs | 66 mV (−6.3 dB) | 76 mA (+5.6%) | 1 cycle |
| 4-Tap Filter Encoding @ Fs/2 | 57 mV (−7.2 dB) | 74 mA (+2.8%) | 1 cycle |

As illustrated in the graphs of FIGS. 11A, 11B and Table I, a potential benefit of one application of an example embodiment of the present technology is a reduction of the induced voltage at or about a frequency associated with a resonant frequency of the power delivery network.

Figure 12:
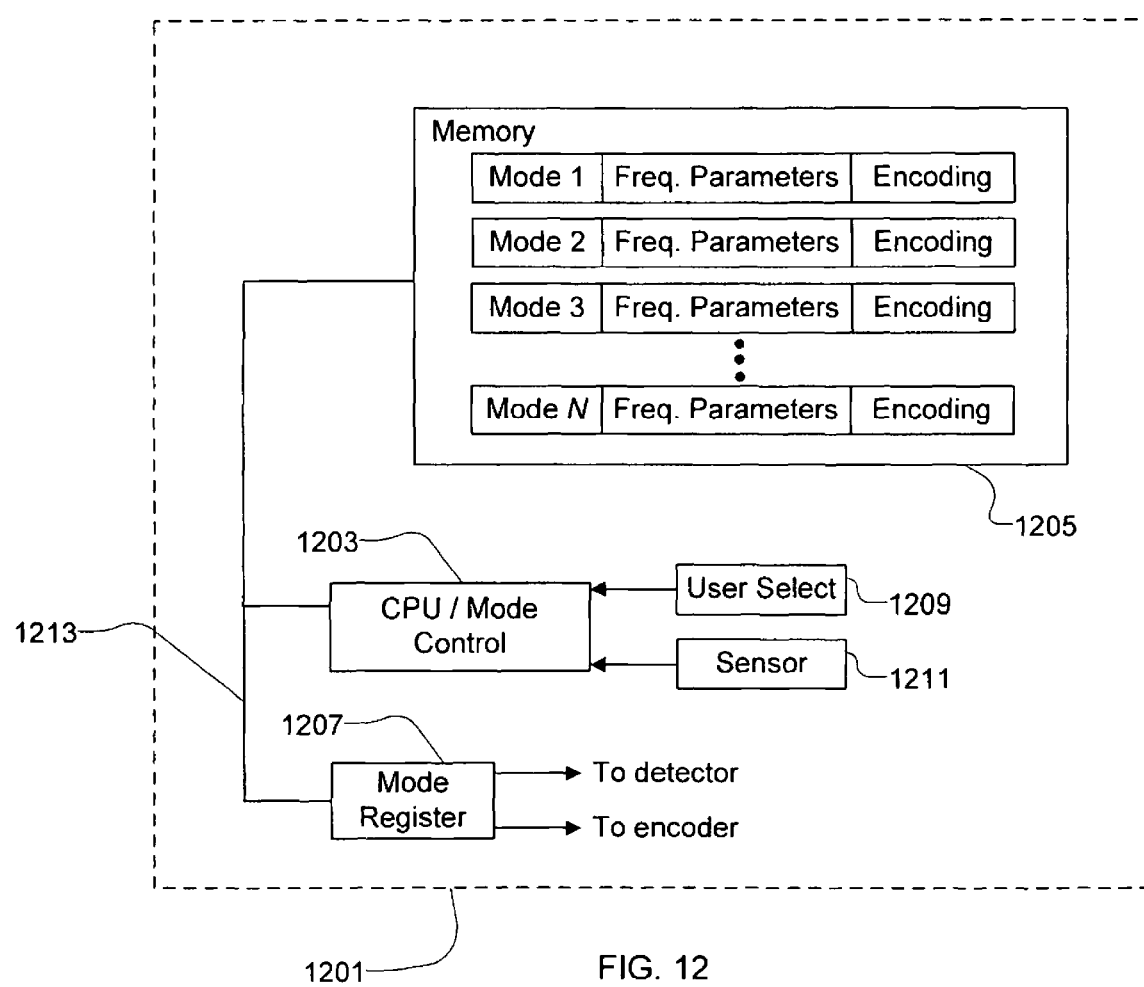
FIG. 12 illustrates a register used to store parameters for different operating modes, for example, that may be used by a portable device to adjust encoding to achieve frequency-related objectives in a variety of environments.

FIG. 12 presents an example of a multi-mode implementation using the aforementioned principles. In particular, a device 1201 (indicated in phantom lines) may be a designed to change encoding to suit different circumstances or environments. To provide one non-limiting example, the device 1201 may be a portable device (such as a cell phone, game or other portable device) in which frequency of internal operations are adjusted to one of several modes. The device 1201 may include a CPU or other controller 1203, a memory 1205 that stores a number of preprogrammed modes, and a mode register 1207 into which one of the modes from the memory 1205 is dynamically loaded during run-time operation. Applying the example of a portable device, one mode of operation can include applying no frequency encoding at all (in which case the frequency characteristics of a mode, e.g., "mode 1", may be a null set), while a second mode of operation can implement an "airplane mode" (e.g., in which internal bus operations are controlled so as to minimize frequencies which might interfere with aircraft avionics or other equipment). Such a mode may be selected by a user, or may be automatically activated by the device depending upon detected environment. Nearly any number of modes may be provided, as depicted by a number of modes "1" to "N" within the memory 1205. As each mode is selected, corresponding mode number, corresponding frequency parameters and encoding schemes are loaded into the mode register 1207 for use in actively controlling the device; to this effect, the mode register is depicted as having two outputs, a first one provided to the detector (mentioned in connection with embodiments discussed above) and a second one provided to the encoder (as discussed in connection with embodiments above). The frequency parameter information, depicted as part of the preprogrammed parameters for each mode stored in the memory 1205, represent one or more frequencies or frequency bands that are to be detected by the detector, while corresponding encoding information may be used by the encoder to implement a desired encoding scheme upon detection of the associated parameters. Other methodologies and control points may also be employed. As indicated by the presence of a user select box 1209 and a sensor box 1211 depicted at the lower right of FIG. 12, the CPU or controller 1203 may be driven to change mode in response to a user selection or in response to external stimuli as detected by a sensor (e.g., based on device location or other detected parameters). The memory 1205 and the mode register 1207 may be separate units that are independently controlled by the CPU or controller 1203, or may be controlled as a single function, for example, through the use of a mode control signal 1213 that indicates to the mode register 1207 exactly which mode is to be retrieved from memory and applied in device operations.

In general, each of the circuits or elements of the data system as discussed herein may be realized on one or more integrated chips or one or more integrated circuits. The data system may be part of the integrated circuits of digital processing devices, computers, computer peripherals, graphics processing devices, etc. For example, the data system and/or detectors may be implemented with multiple integrated circuits where the bus implements communications between the distinct integrated circuits. These distinct integrated circuits may even be part of distinct components or modules of a system where the bus between the components or modules is used for transfer of data between the components. However, the data system may also be implemented on a single integrated chip and may be implemented for transmitting data between functional circuit blocks of the integrated chip. For example, the circuits may be implemented as part of a central processing unit or CPU as commonly employed in a digital computer or may be employed as an intermediary between the CPU and other circuit chips. Thus, circuits of the data system as discussed herein can be incorporated in the communication path between a processor such as a CPU and a cache memory. Thus, received data signals may be baseband data signals that are transmitted between circuit components thereof. The bus technology may also be implemented as elements of point-to-point connections. By way of further example, the technology may also be implemented in high performance serial links (e.g., backplane links, PCI Gen3 lines, SATA Gen3/4, etc.) The technology can also be used with particular types of bus connections, e.g., arrangements in which the same signal is sent to plural devices connected to the same conductors. The data system can even be implemented for parallel links such as parallel buses or any other device implementing parallel communications. The technology may be used in DDR, GDDR, RDRAM technologies and in parallel single-ended signaling interfaces. In other embodiments, the circuits may be an element of data input or output device controllers or the like, such as a memory controller and/or memory modules (e.g., dynamic random access memory and flash memory).

For example, in a memory controller embodiment, the memory controller generally acts as the device that sends data to the memory for a writing operation and receives data back from the memory for a reading operation. The bus of the data system 102 may be implemented to transmit signals sent from either or both of the memory and memory controller and may be realized in either or both of these devices with the remaining elements of the data system as discussed herein.

In general, each of the circuits implemented in the technology presented herein may be constructed with electrical elements such as traces, capacitors, resistors, transistors, etc. that are based on metal oxide semiconductor (MOS) technology, but may also be implemented using other technology such as bipolar technology or any other technology in which a signal-controlled current flow may be achieved.

Furthermore, these circuits of the data system 102 may be constructed using automated systems that fabricate integrated circuits. For example, the elements and systems described herein may be designed as one or more integrated circuits, or portions of an integrated circuit, based on design control instructions for doing so with circuit-forming apparatus that controls the fabrication of the elements or blocks of the integrated circuits. The instructions may be in the form of data stored in, for example, a computer-readable medium such as a magnetic tape or an optical or magnetic disk. The design control instructions typically encode data structures or other information or methods describing the circuitry or circuit elements that can be physically created as the elements of the integrated circuits. Although any appropriate format may be used for such encoding, such data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can then use such encoded data to fabricate integrated circuits comprising one or more of the circuits described herein.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order or count, but merely to assist in explaining elements of the technology.

Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology. For example, the detector of the present technology may monitor frequency information of multiple data busses for controlling encoding of data transmitted on one or more of the multiple data busses.

The invention claimed is:

1. A device comprising:
   an encoder to encode signals to be transmitted on a plurality of signal lines that form at least part of a conductive bus;
   a detector to detect a frequency component of a variation of a weight representing the signals concurrently transmitted on the plurality of signal lines; and,
   wherein an output of the detector controls the encoder to selectively apply the encoding based on the frequency component.

2. The device of claim 1 wherein the detector comprises a filter.

3. The device of claim 1 wherein the detector is configured to change a setting of the encoder in response to the frequency component corresponding to a resonant frequency of a communication system power delivery network.

4. The device of claim 1 wherein the detector is configured to change a setting of the encoder to reduce a magnitude of a frequency detrimental to a power delivery network that provides power to said device.

5. The device of claim 1 wherein the encoder circuit includes a bus inversion circuit, the bus inversion circuit to selectively invert all signals to be concurrently transmitted on the plurality of signal lines.

6. The device of claim 1 wherein the detector comprises a summer coupled to a digital-to-analog converter coupled to a low pass filter coupled to a comparator.

7. The device of claim 1 wherein the detector comprises a summer coupled to a filter coupled to a comparator.

8. The device of claim 7 wherein the filter is a band-pass filter, set with a band-pass characteristic at a resonant frequency of a power delivery network of the bus.

9. The device of claim 1 wherein the detector is to accept both signals received by said device from the plurality of signal lines and signals to be transmitted by said device on the plurality of signal lines, such that the detector detects the frequency component to the extent present in bidirectional communications on the plurality of signal lines.

10. The device of claim 1 wherein the detector produces an output dependent on a Hamming weight of the signals to be concurrently transmitted on the bus and wherein the detector is to respond to a frequency component associated with the variation of plural Hamming weights over time.

11. The device of claim 1 further comprising a memory controller wherein the memory controller is to control a read operation and a write operation on the plurality of signal lines, and wherein the plurality of signal lines includes at least one of an address bus, a control bus or a data bus, where the plurality of signal lines is at least four bits wide.

12. The device of claim 1 further including a serializer wherein parallel data is serialized for processing by the detector.

13. The device of claim 1 wherein the detector is to respond to the frequency component of signals to be transmitted on the plurality of signal lines including signals to be transmitted during idle times of the bus, such that frequency component reflects both times of active signal transmission as well as times of no signal transmission.

14. The device of claim 1 wherein the plurality of signal lines are data lines that form at least part of a parallel data bus.

15. A method for controlling a bus having at least two signal lines, the method comprising:
   generating a measure for each of a group of signals to be concurrently transmitted by a transmitter on the bus;
   detecting a predetermined frequency component in a variation of the measure over time to generate a coding control signal; and
   controlling coding of the bus in response to the detecting.

16. The method of claim 15 further comprising transmitting signals on the at least two signal lines of the bus according to the coding.

17. The method of claim 15 wherein the bus comprises a single ended parallel bus.

18. The method of claim 15 wherein the coding comprises bus inversion coding.

19. The method of claim 15 wherein the detecting is also performed on signals received from the bus from a remote, second transmitter.

20. The method of claim 15 wherein the measure is a Hamming weight and the detecting responds to a frequency component of time-varying Hamming weights.

21. The method of claim 15 further comprising transmitting signals on the at least two signal lines of the bus according to the coding, wherein transmitting is performed by a memory controller as part of a write operation to a memory device.

22. The method of claim 15 further comprising serializing parallel data for the detecting.

23. The method of claim 15 wherein the predetermined frequency component is a resonant frequency of a phase lock loop circuit or delay lock loop circuit involved in clocking of transmission of signals on the bus.

24. An integrated circuit for bus coding comprising:
a detector to sense a frequency spectrum characteristic associated with aggregated, concurrent transmission on a plurality of signal lines of a bus and to generate a control signal based on the frequency spectrum characteristic;
a bus encoder coupled with the detector to set data encoding of the plurality of signal lines of the bus; and,
wherein the bus encoder is set by the control signal.

25. The integrated circuit of claim 24 wherein the detector is to detect the frequency spectrum characteristic based on concurrently transmitted signals received from the bus from a second integrated circuit and based also on signals to be concurrently transmitted via the bus to said second integrated circuit.

26. The integrated circuit of claim 24 wherein the frequency spectrum characteristic is based on a plurality of Hamming weights and the detector is configured to respond to a frequency component of the plurality of Hamming weights.

27. The integrated circuit of claim 24 further comprising a memory controller wherein the memory controller is configured to control a read operation and a write operation on the plurality of signal lines.

28. The integrated circuit of claim 24 wherein the detector comprises a band-pass filter.

29. The integrated circuit of claim 28 wherein the bus encoder comprises a data bus inversion circuit.

30. The integrated circuit of claim 29 wherein the detector is configured to change a setting of the encoder in response to a frequency spectrum characteristic associated with a resonant frequency of a power delivery network that supplies power to the integrated circuit.

31. The integrated circuit of claim 30 wherein the detector further comprises a summer coupled with a comparator.

32. The integrated circuit of claim 24 further including a serializer wherein parallel data is serialized for processing by the detector.

33. A method of encoding a bus, comprising:
encoding signals to be transmitted by a sender over the bus;
monitoring a frequency component present in a time-varying measure of all signals concurrently transmitted over the bus; and
controlling the encoding to reduce the magnitude of at least one frequency component in the time-varying measure.

34. The method of claim 33 wherein the bus has at least four parallel signal lines, and the encoding selectively and concurrently inverts each parallel signal line in the bus.

35. The method of claim 33 wherein the encoding includes bus inversion.

36. The method of claim 33 wherein the monitoring includes bitwise summing of outputs of lines of the bus to produce a sum for each of a group of signals to be concurrently transmitting, and monitoring a frequency component of changes of the sum over time.

37. The method of claim 33 wherein the monitoring further includes monitoring of inbound signals and outbound signals, summing bit lines for each inbound signal and for each outbound signal, and monitoring a frequency component of change in sums representing the inbound and outbound signals.

38. The method of claim 33 wherein the monitoring further includes monitoring signals from plural busses, summing bit lines for concurrently transmitted signals over each one of the plural busses, and monitoring a frequency component present in a signal indicative of change by successive signals irrespective of bus, and wherein the controlling includes controlling encoding in at least outbound signals on at least one of the plural busses.

39. The method of claim 33 wherein determining includes determining a measure of current draw represented by concurrent drive of plural signals over the bus, wherein the method further comprises determining at least one frequency characteristic associated with bus routing, and wherein the controlling includes comparing the frequency characteristic with the measure of absolute current draw and responsively adjusting encoding in response to frequency of change in the current draw.

40. The method of claim 39 wherein the frequency characteristic includes a resonance frequency.

41. The method of claim 33 wherein the encoding is defined by programmable parameters stored on machine-readable media.

42. The method of claim 33 further comprising encoding the bus to implement one of plural preprogrammed encoding modes, wherein each encoding mode has an associated encoding scheme, and wherein controlling encoding includes receiving a mode control signal and retrieving and applying the encoding scheme associated with a mode indicated by the mode control signal.

* * * * *